(12) United States Patent
Slater

(10) Patent No.: US 10,300,815 B1
(45) Date of Patent: May 28, 2019

(54) VEHICLE EXTENDABLE SEATS AND METHOD OF USE

(71) Applicant: Premier Products, Inc., Marlton, NJ (US)

(72) Inventor: David Slater, Elkhart, IN (US)

(73) Assignee: Premier Products, Inc., Marlton, NJ (US)

( * ) Notice: Subject to any disclaimer, the term of this patent is extended or adjusted under 35 U.S.C. 154(b) by 0 days.

(21) Appl. No.: 16/115,830

(22) Filed: Aug. 29, 2018

Related U.S. Application Data

(63) Continuation-in-part of application No. 16/115,702, filed on Aug. 29, 2018.

(51) Int. Cl.
| | |
|---|---|
| *A47C 17/04* | (2006.01) |
| *B60N 2/34* | (2006.01) |
| *B60N 2/005* | (2006.01) |
| *B60N 2/02* | (2006.01) |
| *B60N 3/00* | (2006.01) |

(52) U.S. Cl.
CPC .............. *B60N 2/34* (2013.01); *B60N 2/005* (2013.01); *B60N 2/0232* (2013.01); *B60N 2/0292* (2013.01); *B60N 3/008* (2013.01)

(58) Field of Classification Search
CPC ....... A47C 1/023; A47C 1/03; B64D 11/0641; B64D 11/06; B60N 2/34
See application file for complete search history.

(56) References Cited

U.S. PATENT DOCUMENTS

| | | | |
|---|---|---|---|
| 1,353,232 A | 9/1920 | Griffin et al. | |
| 1,360,162 A | 11/1920 | Westrum | |
| 1,378,615 A | 5/1921 | Rehanek | |
| 1,390,177 A | 9/1921 | Taylor | |
| 1,548,334 A * | 8/1925 | Sebell | B60N 2/34 297/284.3 |
| 1,640,984 A | 8/1927 | De Petris | |
| 1,644,405 A | 10/1927 | Underwood | |
| 1,725,807 A | 8/1929 | Leutz | |
| 2,309,735 A | 2/1943 | Koch et al. | |
| 2,576,343 A * | 11/1951 | Hibbard | B60N 2/34 297/284.1 |
| 2,796,111 A | 6/1957 | Janczyszyn | |
| 3,193,324 A | 7/1965 | Stock | |
| 3,596,981 A * | 8/1971 | Koziol | A47C 17/16 297/154 |
| 3,887,229 A * | 6/1975 | Plume | A47C 17/1753 297/65 |

(Continued)

FOREIGN PATENT DOCUMENTS

CA 1149555 7/1983

*Primary Examiner* — Shin H Kim
(74) *Attorney, Agent, or Firm* — Law Office of Mark Brown, LLC; Christopher M. DeBacker

(57) ABSTRACT

Adjustable driver's side and passenger's side side-facing sliding seat assemblies. Each side-facing sliding seat assembly is adjustable between an original seat orientation to an extended, sleeping surface configuration wherein the two side-facing sliding seat assemblies converge together, forming a flat sleeping surface. The side-facing sliding seat assemblies may also mate with a lay-flat sofa bed assembly for a larger flat sleeping surface. Each of the side-facing sliding seat assemblies may be powered and adjustable using a motor to transform between their two respective configurations.

15 Claims, 42 Drawing Sheets

(56) References Cited

U.S. PATENT DOCUMENTS

| | | | |
|---|---|---|---|
| 3,910,630 A * | 10/1975 | Runyon | A47C 13/00 |
| | | | 297/63 |
| 4,065,174 A | 12/1977 | Yokohama et al. | |
| 4,186,960 A | 2/1980 | Mizelle | |
| 4,321,716 A | 3/1982 | Shrock | |
| 4,512,048 A | 4/1985 | Isham et al. | |
| 4,543,675 A | 10/1985 | Shrock | |
| D281,379 S | 11/1985 | Isham et al. | |
| 4,563,784 A | 1/1986 | Shrock et al. | |
| 4,625,346 A * | 12/1986 | Quackenbush | A47C 17/161 |
| | | | 297/342 |
| 4,731,888 A | 3/1988 | Bridges | |
| 4,750,222 A | 6/1988 | Quakenbush | |
| 4,756,034 A | 7/1988 | Stewart | |
| 4,932,709 A | 6/1990 | Wainwright | |
| 4,937,900 A | 7/1990 | Bridges | |
| 5,231,710 A * | 8/1993 | Markel | A47C 17/13 |
| | | | 297/107 |
| 5,528,778 A | 6/1996 | Shrock et al. | |
| 5,718,479 A * | 2/1998 | Rautenbach | A47C 17/80 |
| | | | 297/353 |
| 5,787,522 A | 8/1998 | Swihart | |
| 5,860,702 A | 1/1999 | Pilarczyk et al. | |
| 6,439,636 B1 | 8/2002 | Kuo | |
| 8,984,680 B2 * | 3/2015 | Smith | A47C 17/165 |
| | | | 5/17 |
| 9,738,185 B1 * | 8/2017 | Guygaew | B60N 2/34 |
| 9,888,781 B2 * | 2/2018 | Wallis | B60N 2/00 |

* cited by examiner

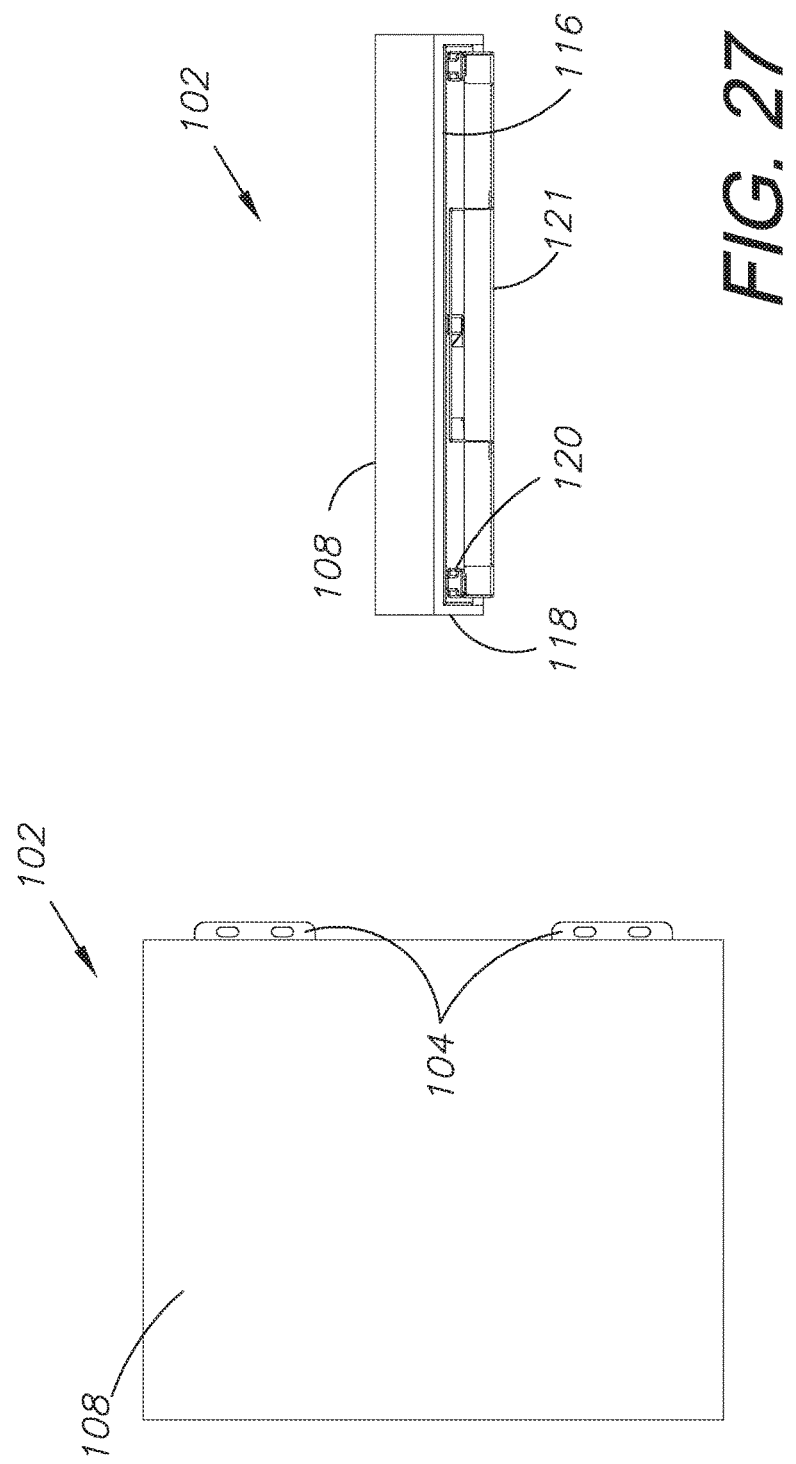

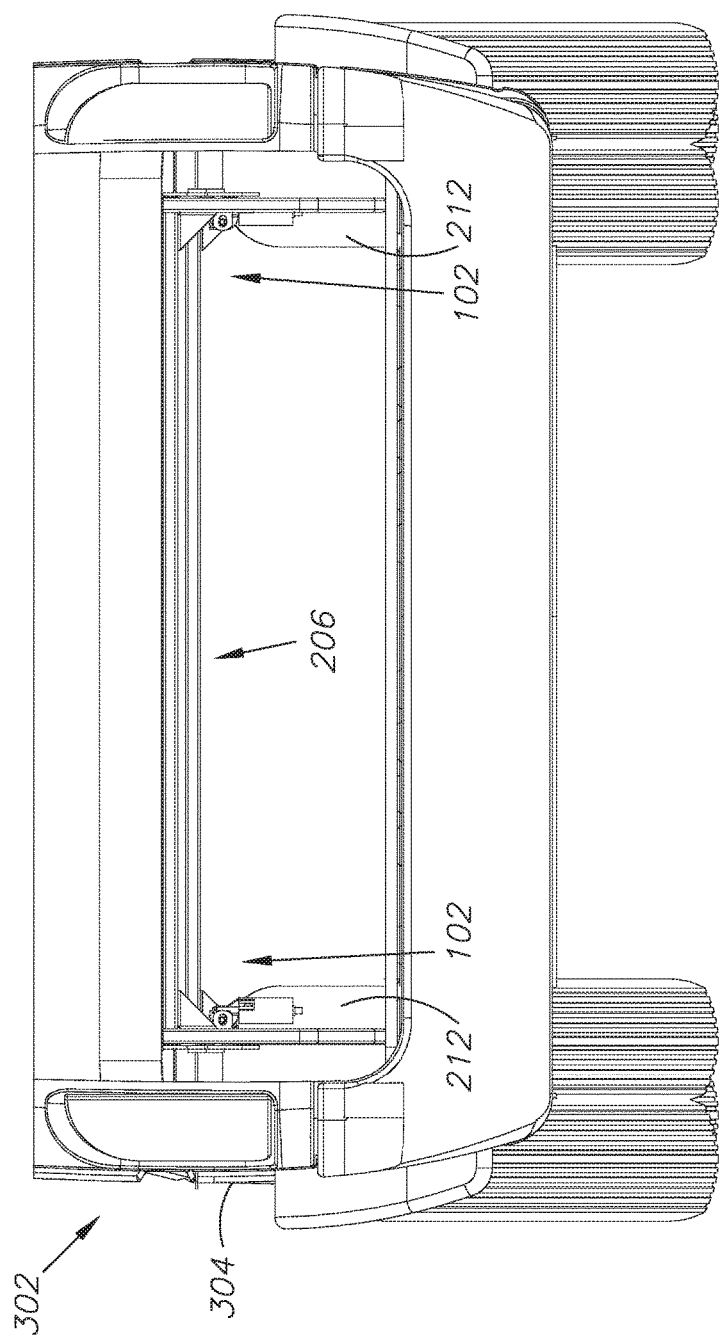

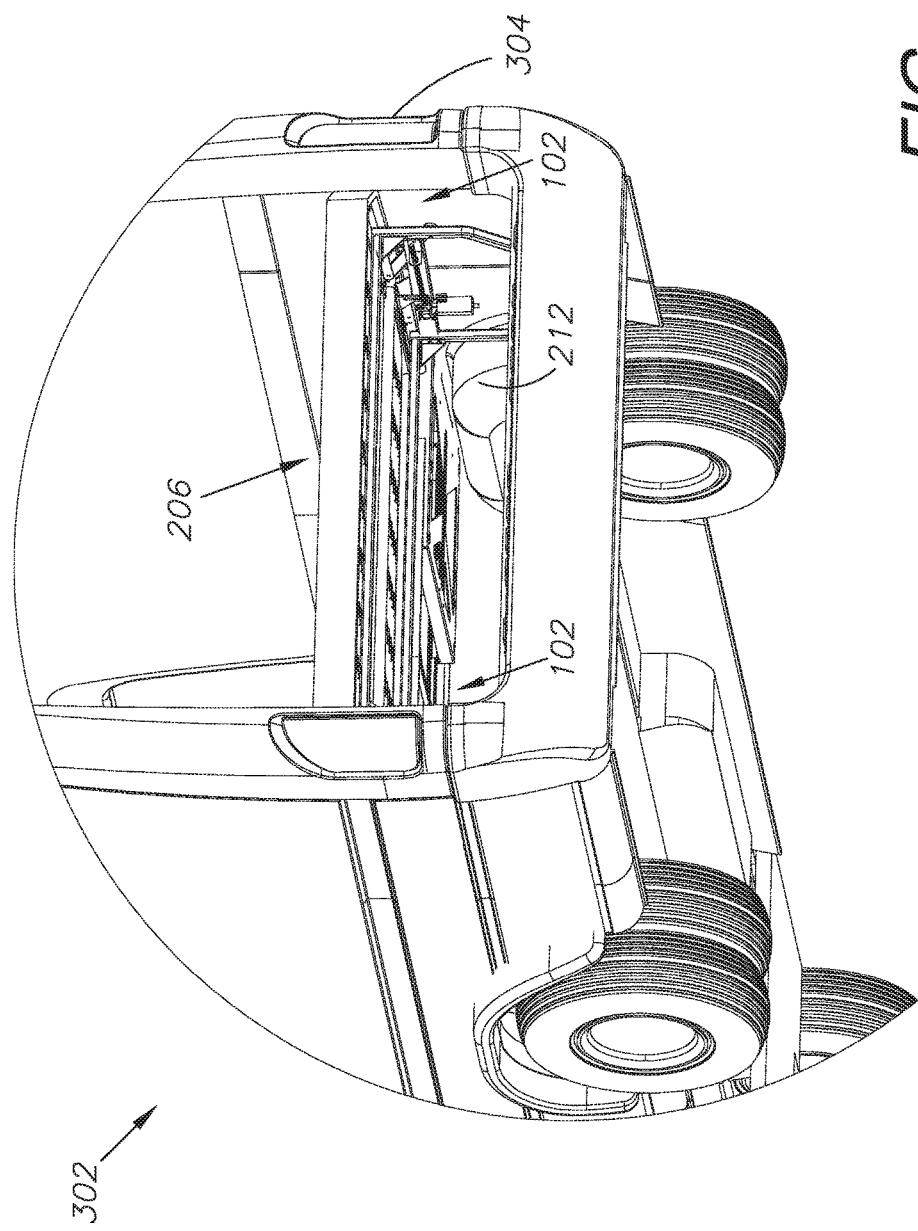

VEHICLE EXTENDABLE SEATS AND METHOD OF USE

CROSS-REFERENCE TO RELATED APPLICATION

This application is a continuation-in-part of and claims priority in U.S. patent application Ser. No. 16/115,702 Filed Aug. 29, 2018, which is incorporated herein by reference.

BACKGROUND OF THE INVENTION

1. Field of the Invention

The present invention relates generally to side-facing vehicle seats and method for use thereof, and more specifically to side-facing sliding seats for mounting into a vehicle for sitting or sleeping, their methods of installation and their methods of use.

2. Description of the Related Art

Luxury vans and recreational vehicles are often outfitted with sofas and seats which can be transferred into beds for sleeping while traveling. Unfortunately, these sofas are rarely the most comfortable place to sleep in when converted into the bed. The conventional sofa-bed leaves a gap between the seat cushion and the back cushion when converted into the bed, and they produce a subtle "v" shape, not lying entirely flat.

Additionally, vehicles can have side-facing sliding seats or jack-knife seats or sofas. They are manual pieces which are pulled out and which may mate with the sofa element in the vehicle. These existing seats have exposed elements, creating a hazard. They also do not create a completely flush sleeping surface with the sofa bed assembly. In the case of jack-knife seats, these cause an uneven sleeping surface that is not completely flat.

Heretofore there has not been available a system or method for a side-facing sliding seats for vehicles with the advantages and features of the present invention.

BRIEF SUMMARY OF THE INVENTION

The present invention generally provides adjustable driver's side and passenger's side side-facing sliding seat assemblies. Each side-seat assembly is adjustable between an original seat orientation to an extended, sleeping surface configuration wherein the two side-facing sliding seat assemblies converge together, forming a sleeping surface between adjacent cushions and an included sofa-bed assembly.

The side-facing sliding seats can be powered using a motor or other power source which allows for automatic conversion between the two orientations.

The side-facing sliding seats may be identical or may be slightly different in orientation depending on the physical constraints of the vehicle. They could be mounted onto legs which are affixed to the floor and/or the wheel well of the vehicle, or may be mounted to the top of built-in cabinets within the vehicle.

The side-facing sliding seats provide inward-facing seats when in the seat orientation. When extended into a sleeping configuration, a modular cushion element may be inserted behind the seat cushion to fill in the gap left when the cushion is extended to the sleeping surface configuration.

BRIEF DESCRIPTION OF THE DRAWINGS

The drawings constitute a part of this specification and include exemplary embodiments of the present invention illustrating various objects and features thereof.

FIG. 26 is a top plan view thereof.

FIG. 27 is a side elevational view thereof.

FIG. 43 is a rear elevational view thereof.

FIG. 44 is another three-dimensional view thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Driver's Side Side-Facing Sliding Seat Assembly 2

Figure 1:
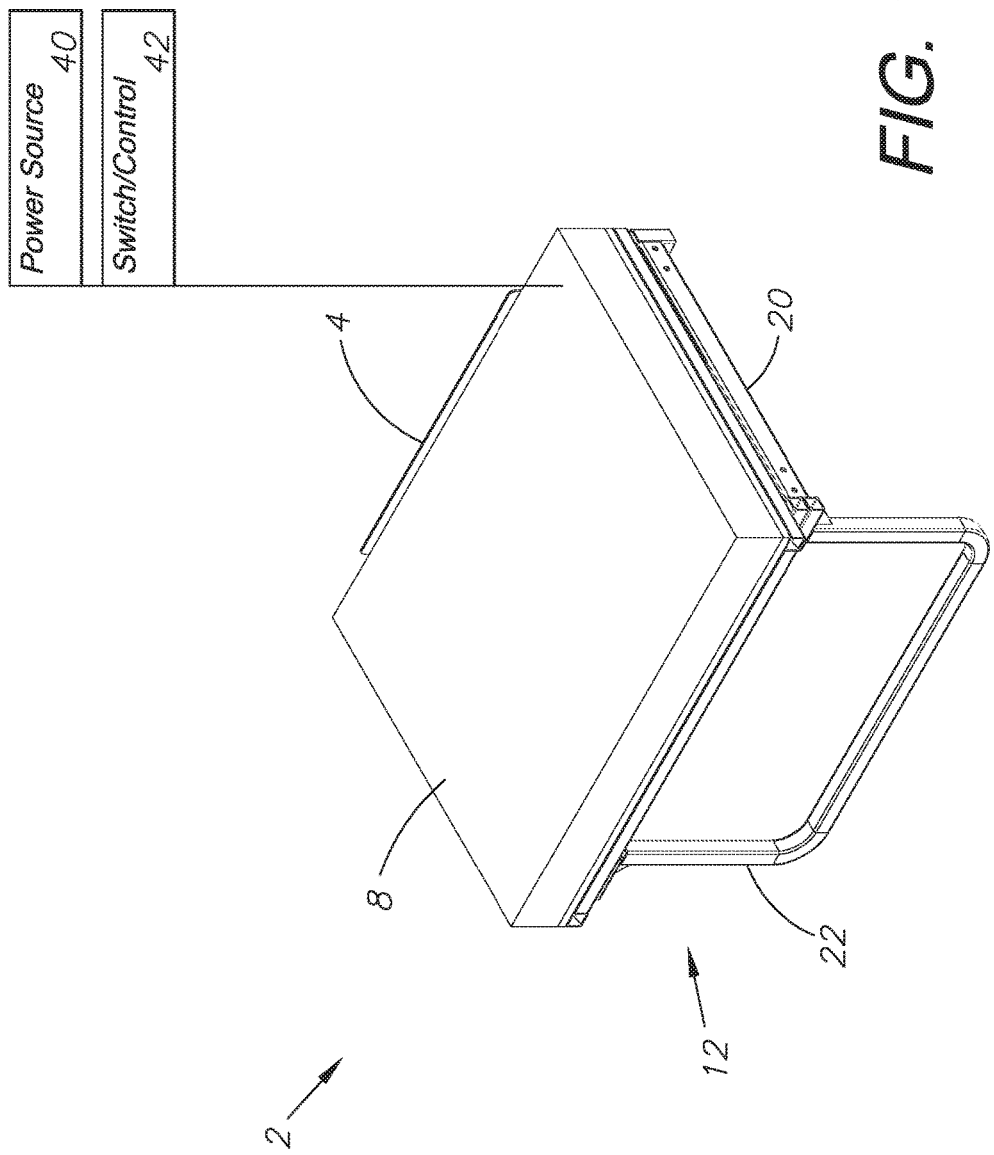
FIG. 1 is three-dimensional isometric view of a preferred embodiment driver's side side-facing sliding seat in a first, original configuration.
Figure 8:
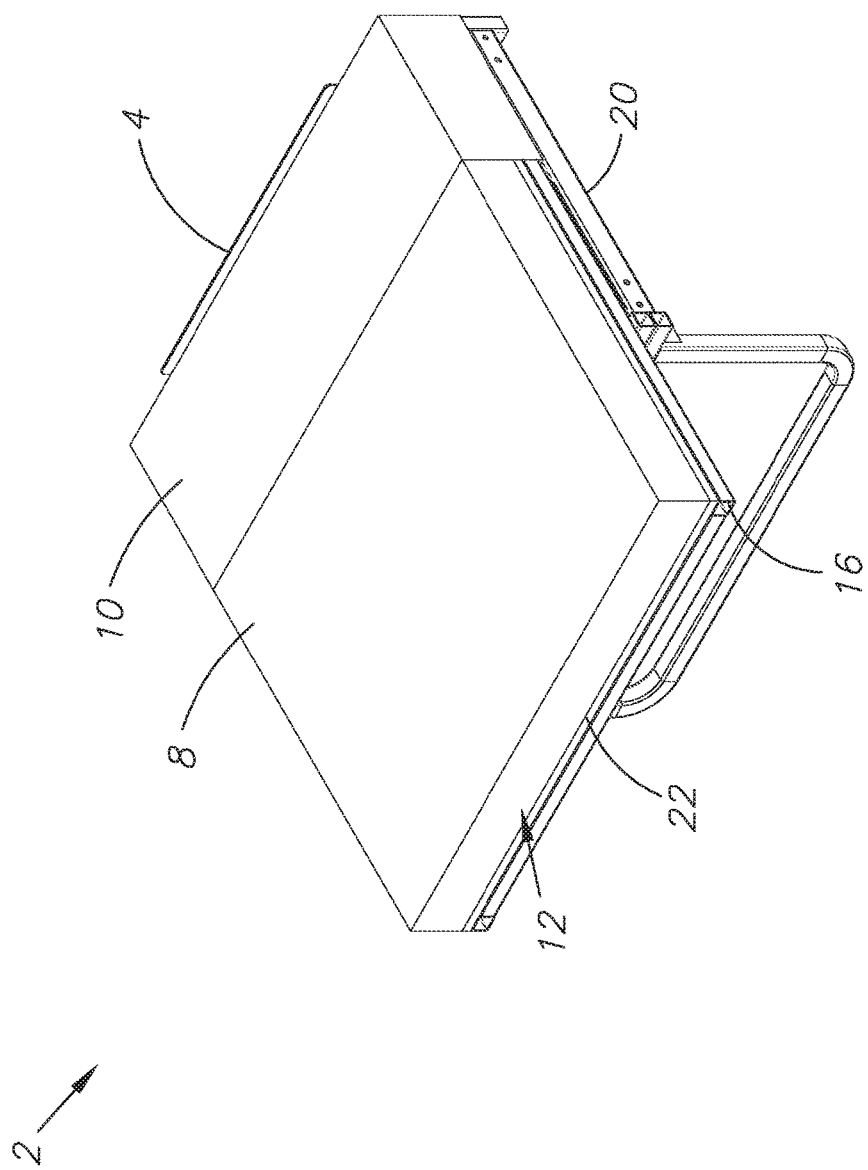
FIG. 8 is a three-dimensional isometric view thereof shown with a modular cushion inserted into the gap.
Figure 9:
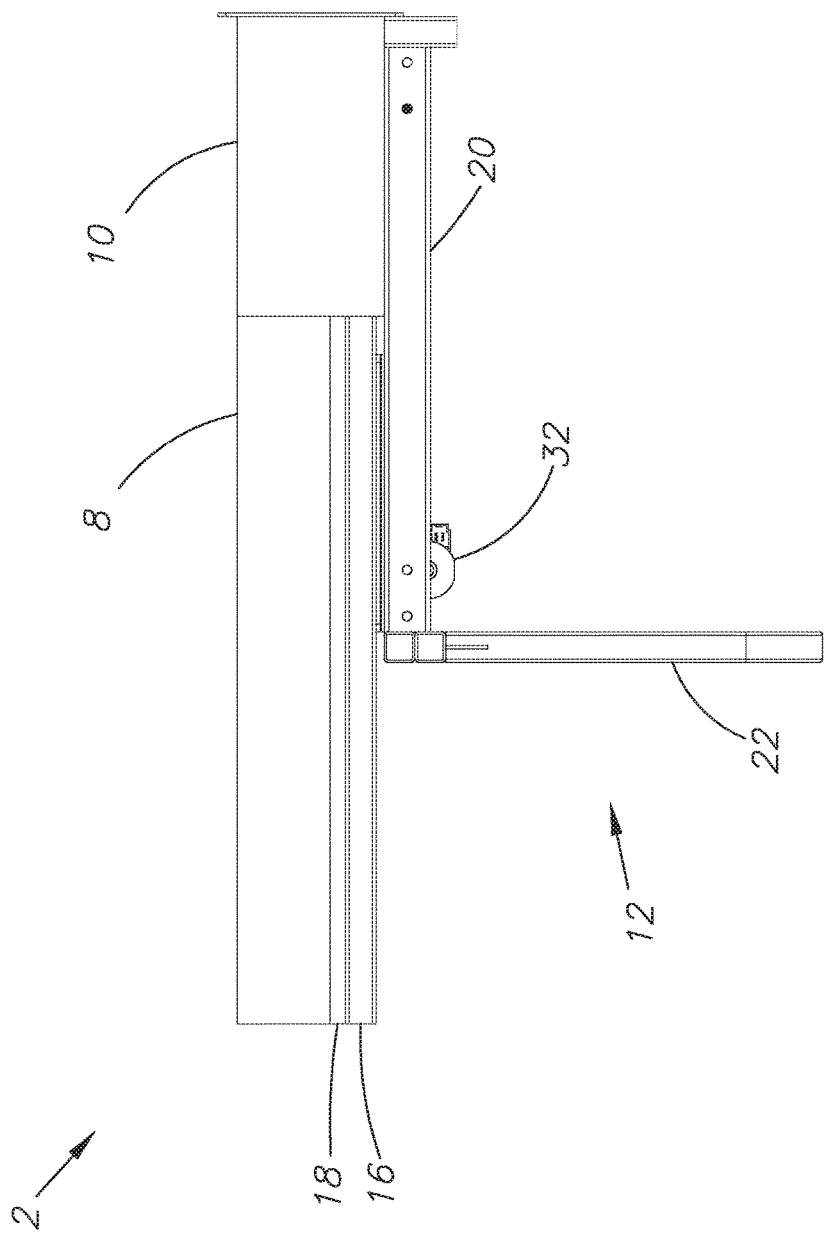
FIG. 9 is a side elevational view thereof.
Figure 10:
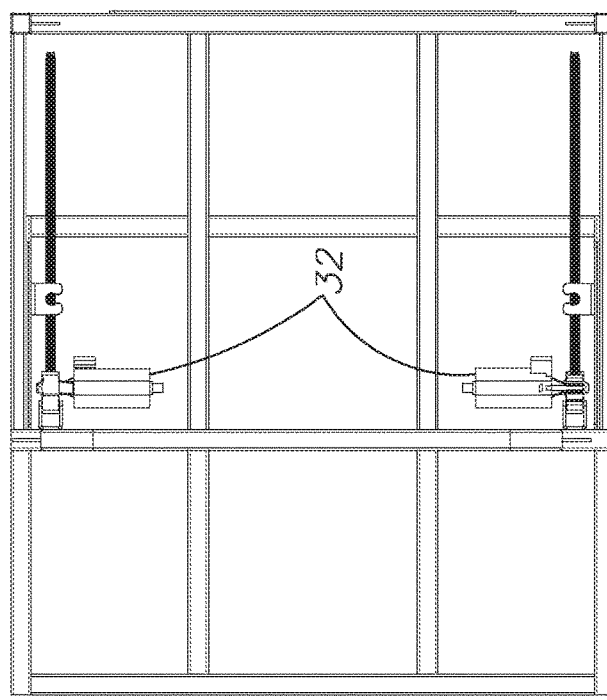
FIG. 10 is a bottom plan view thereof.
Figure 11:
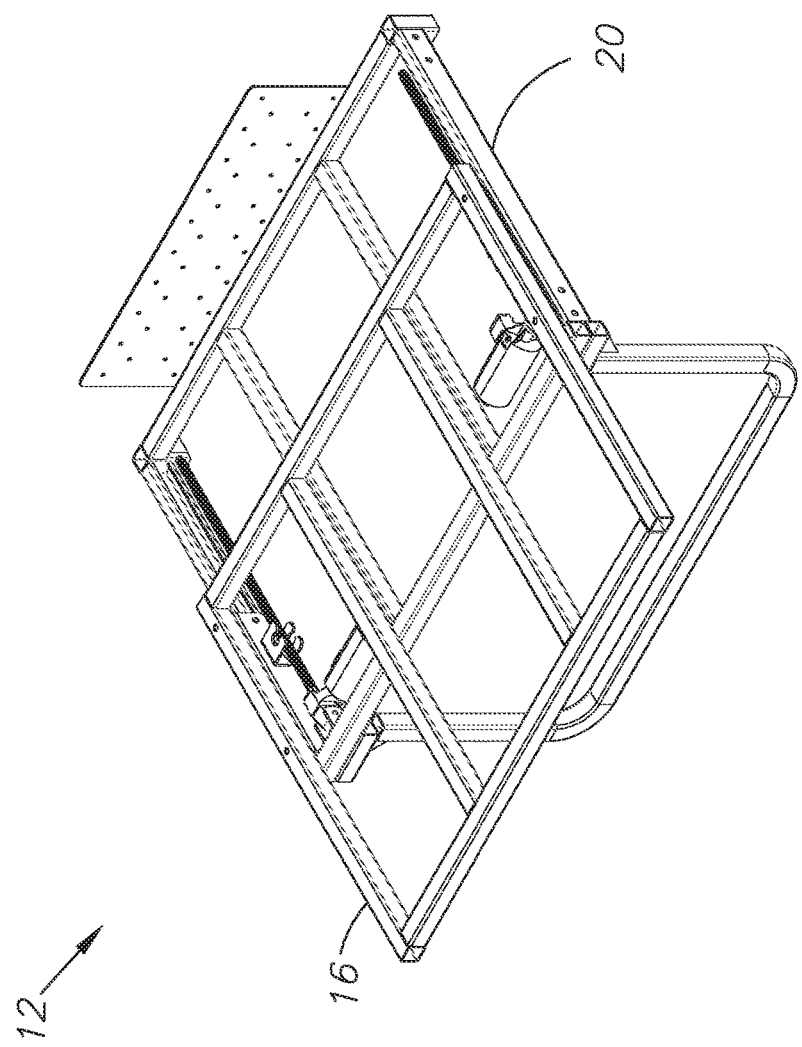
FIG. 11 is a three-dimensional isometric view of the leg frame element of FIG. 6 shown in an extended orientation.

As shown in the figures, the present invention provides a side-facing sliding seat assembly, shown here as a driver's side of a vehicle side-facing sliding seat assembly 2, which can be transformed from a seat as shown in FIG. 1 to an extended configuration as shown in FIG. 8, which provides a larger sleeping surface when combined with a sofa-bed assembly. The side-facing sliding seat assembly 2 generally includes a leg assembly 12, a cushion 8, and a mounting bracket 4. The leg assembly 12 includes the legs 22 and a slide rail 20 for allowing extension of the entire assembly. The legs 22 allows for installation over a wheel well, and could be removed such that the remaining assembly may be installed directly onto a cabinet within the vehicle.

Figure 2:
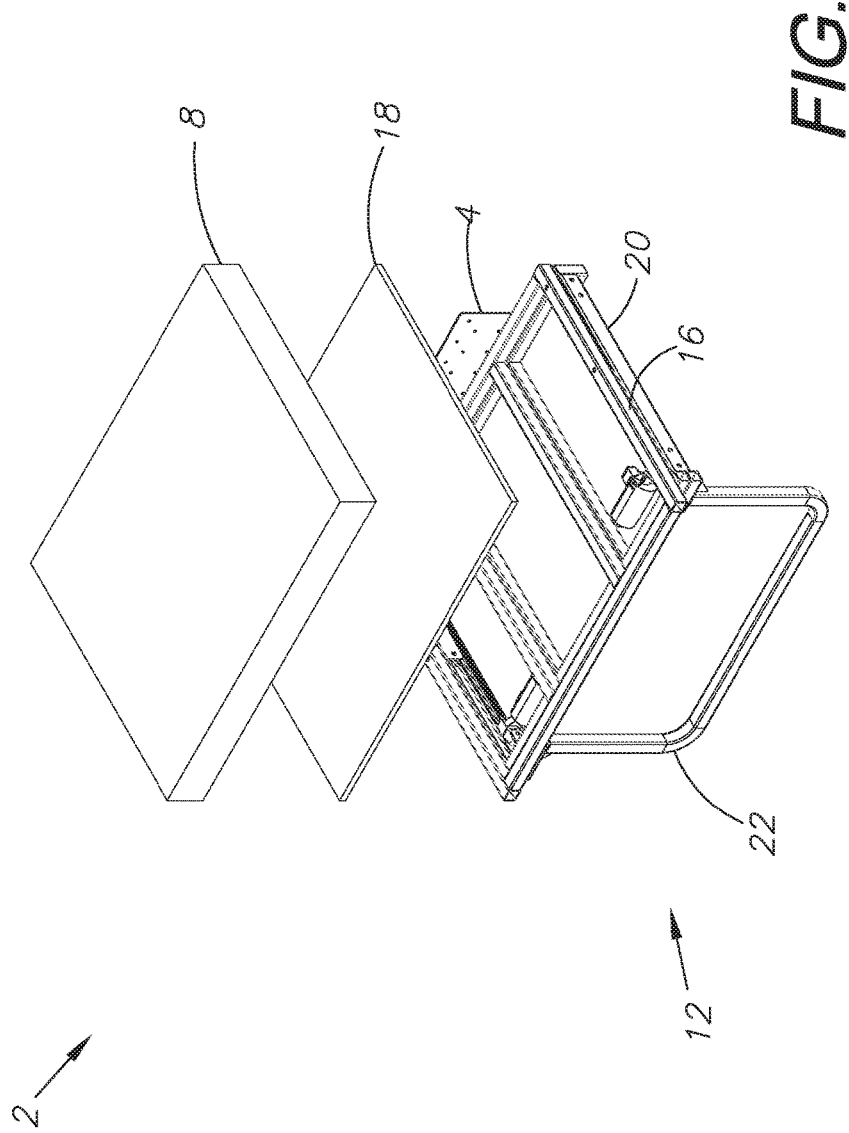
FIG. 2 is a three-dimensional exploded isometric view thereof.
Figure 3:
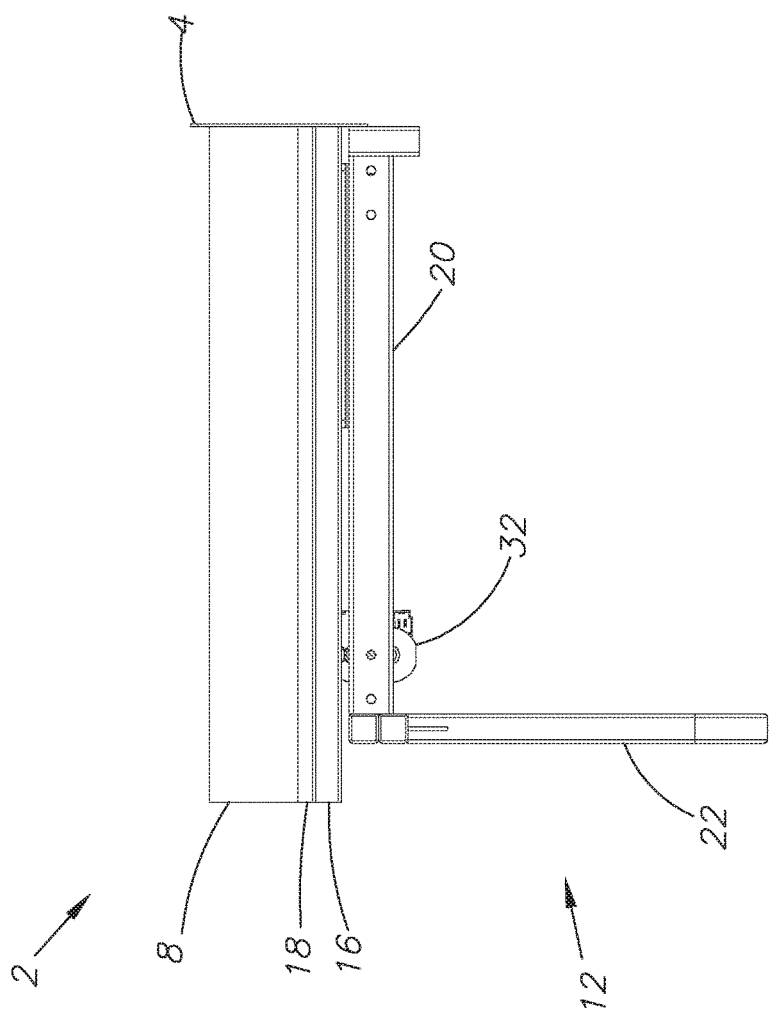
FIG. 3 is a side elevational view thereof.
Figure 4:
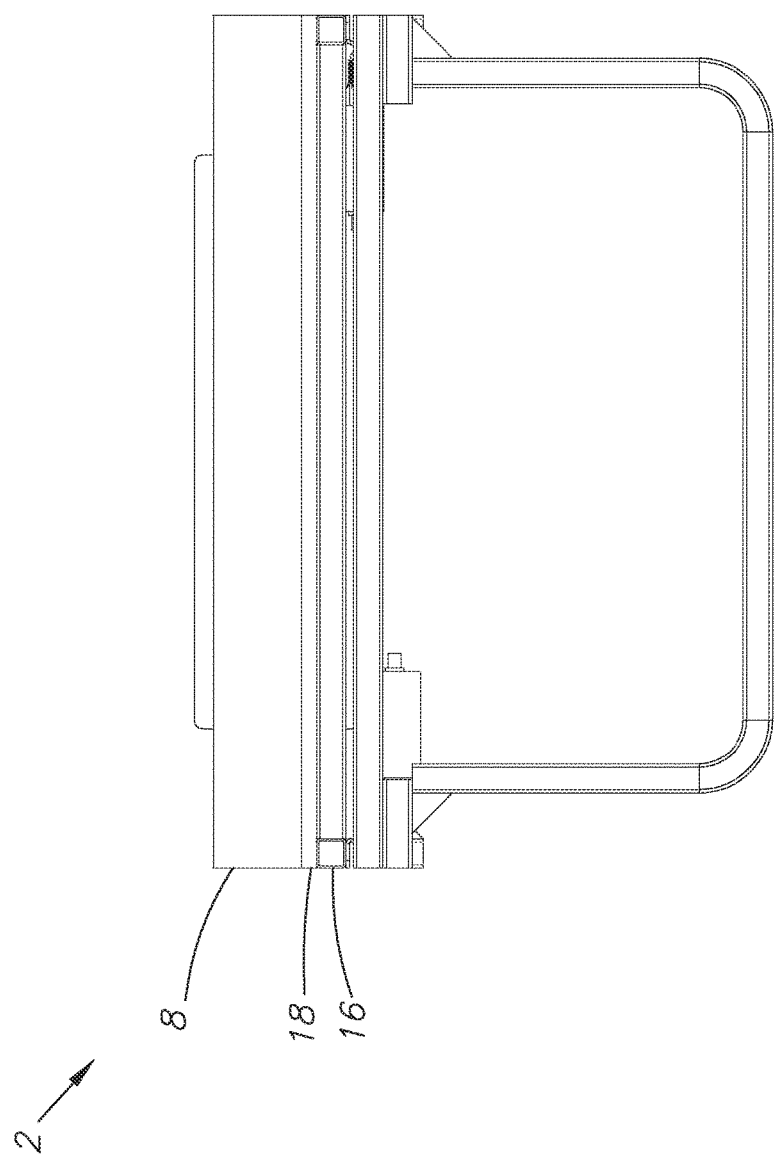
FIG. 4 is a front elevational view thereof.
Figure 5:
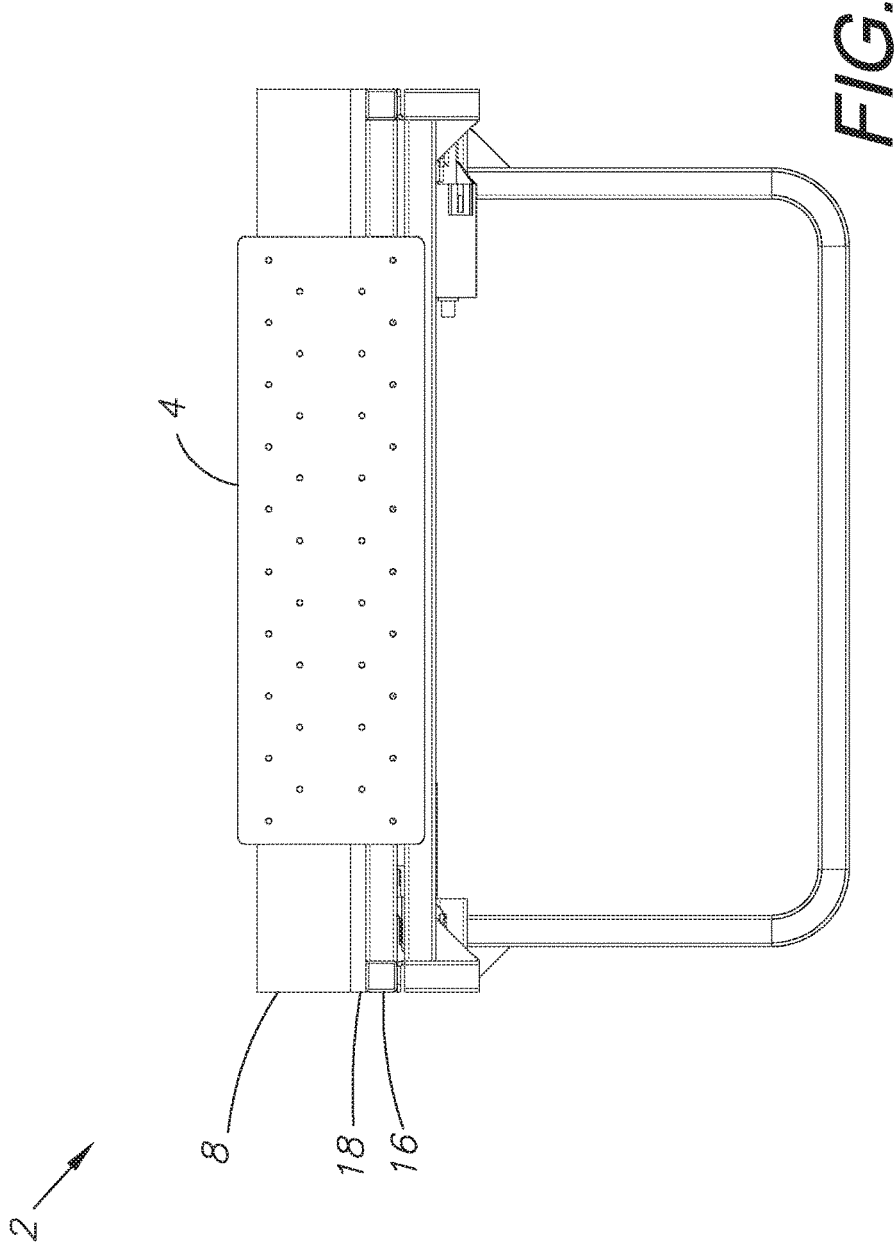
FIG. 5 is a rear elevational view thereof.
Figure 6:
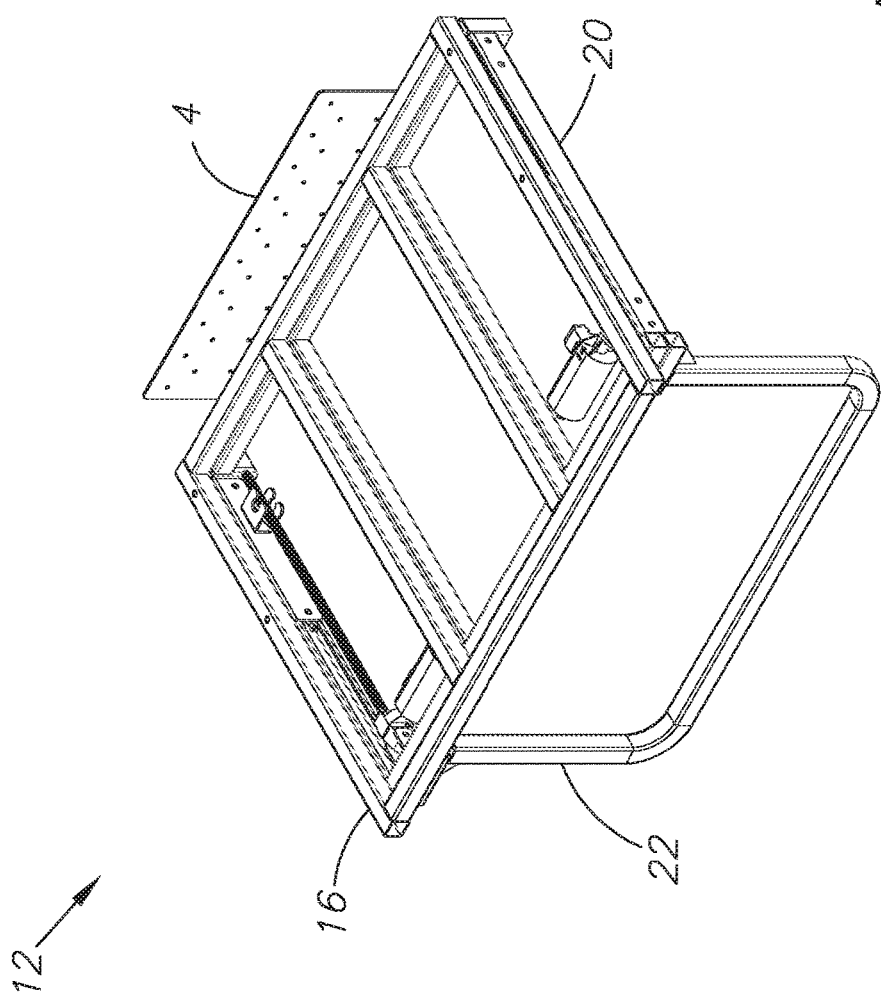
FIG. 6 is a three-dimensional isometric view of a leg frame element thereof.
Figure 7:
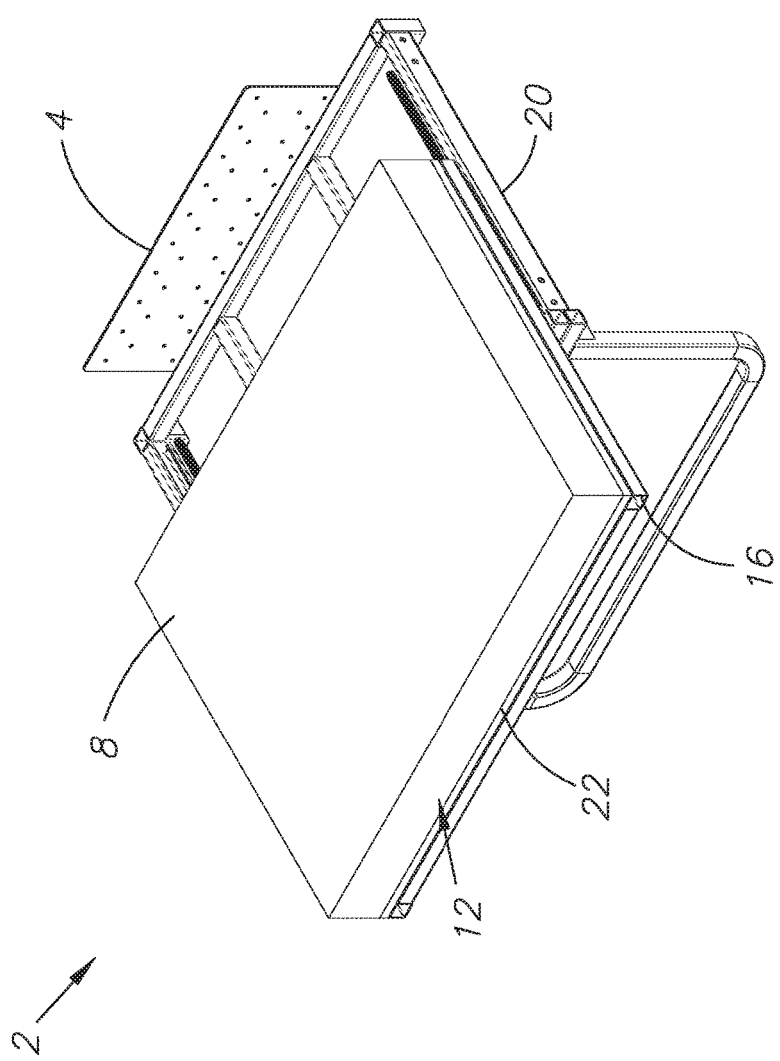
FIG. 7 is a three-dimensional isometric view of the embodiment of FIG. 1 shown in an extended orientation with a gap for a modular cushion.

FIG. 2 shows how the slide 16 mounts to the slide rail 20, and underneath of the support plate 18 and cushion 8, which allows the transformation of the side-facing sliding seat assembly 2. When extended as shown in FIG. 7, a gap is formed which can be filled with a modular cushion 10, providing a larger surface which, when combined with the passenger-side seat assembly 52 and a sofa-bed, provides a larger sleep surface within the vehicle. This is shown in more detail in FIGS. 33-44

The entire side-facing sliding seat assembly 2 could be transformed from the first, original configuration to the second, extended configuration using manual controls or via a powered control. The side-facing sliding seat could be connected to the power of the vehicle and a switch or other controls could be used to mechanically transform the side-facing sliding seat between configurations.

The entire side-facing sliding seat assembly 2 could be transformed from the first, configuration to the second configuration using manual controls or via a powered control. The side-facing sliding seat assembly could be connected to the power of the vehicle and a switch or other controls could be used to mechanically transform the side-facing sliding seat between configurations. The motor 32 controls the physical movement of the side-facing sliding seat assembly slide when transforming between configurations. A power source 40 which is activated by a switch or control 42 would signal the motor to move the pieces of the side-facing sliding seat assembly 2. The motor 32 could be placed in any orientation to allow for installation of elements beneath the side-facing sliding seat assembly 2.

Two such side-facing sliding seat assemblies could be installed across from one another in a vehicle. The two could be identical, or could feature a slightly alternative embodiment as required by the additional features of the vehicle interior. When the two are extended, the cushions 8 of the two respective side-facing sliding seats are pressed together in the center of the vehicle and form no gap for a continuous surface.

III. Passenger Side Side-Facing Sliding Seat Assembly 52

Figure 12:
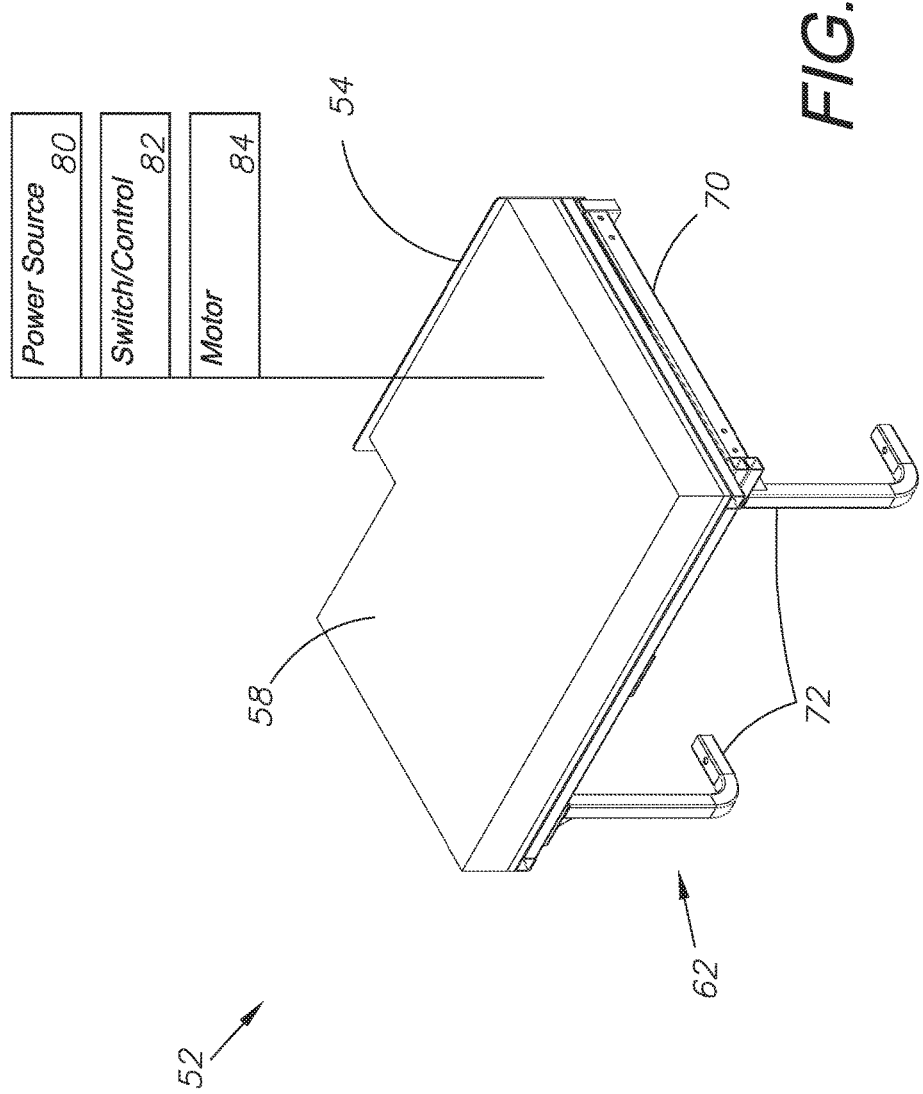
FIG. 12 is a three-dimensional isometric view of a preferred embodiment passenger's side side-facing sliding seat in a first, original extended.
Figure 18:
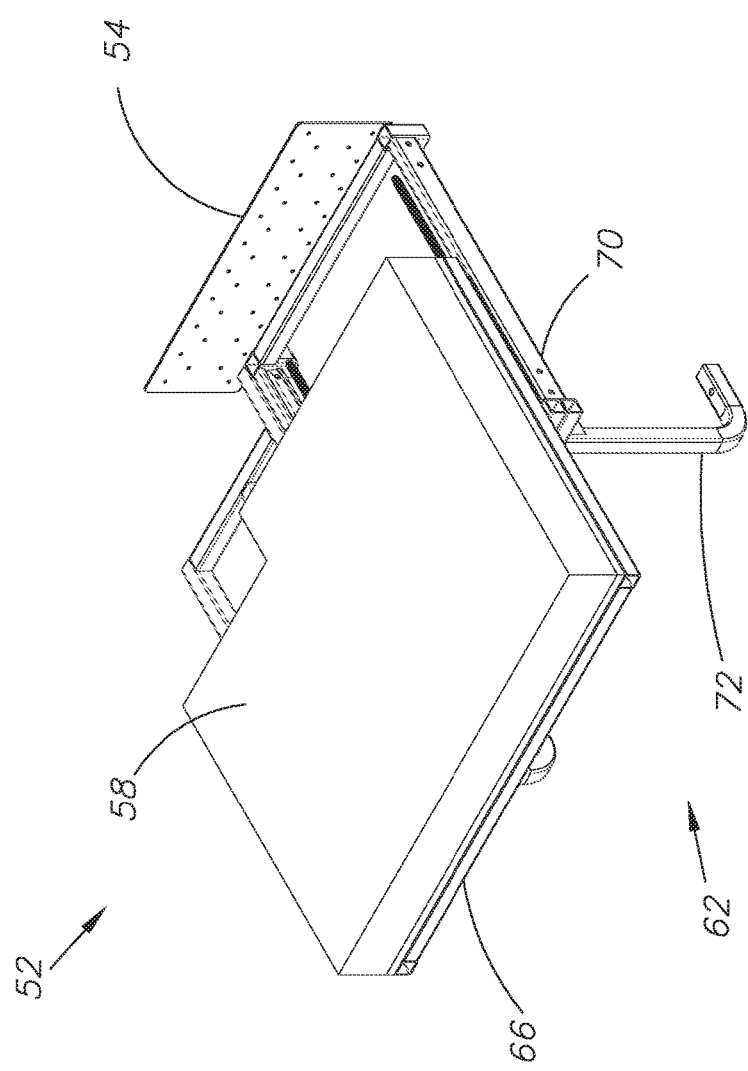
FIG. 18 is a three-dimensional isometric view of the embodiment of FIG. 12 shown in an extended orientation with a gap for a modular cushion.
Figure 19:
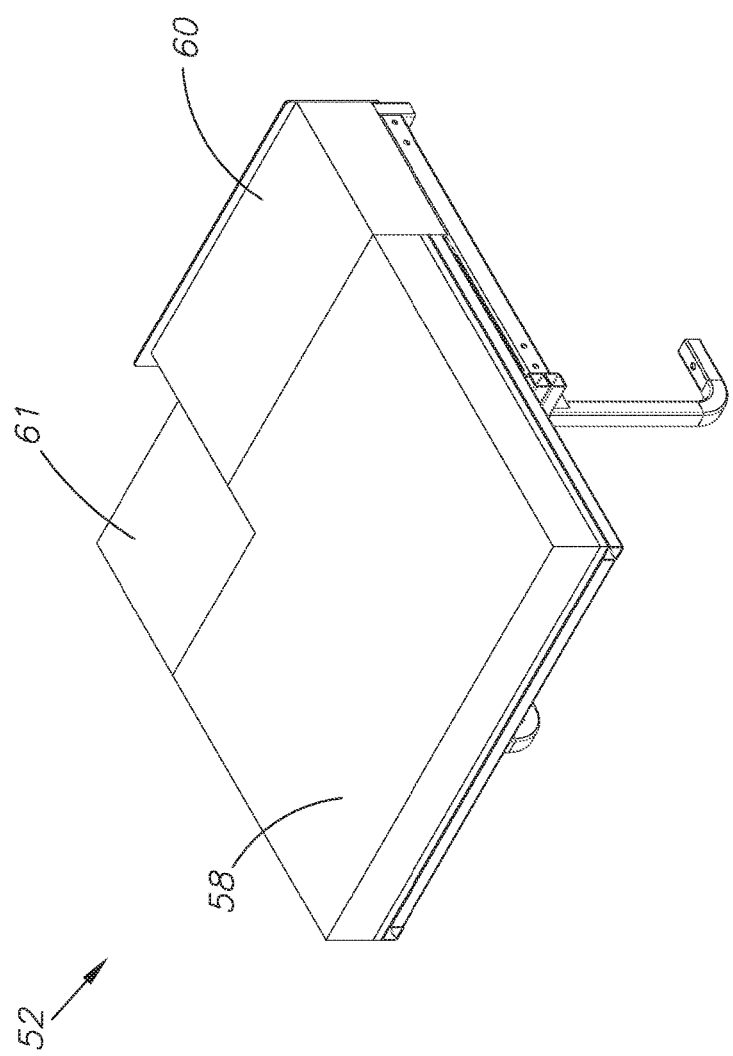
FIG. 19 is a three-dimensional isometric view thereof shown with a modular cushion inserted into the gap.
Figure 20:
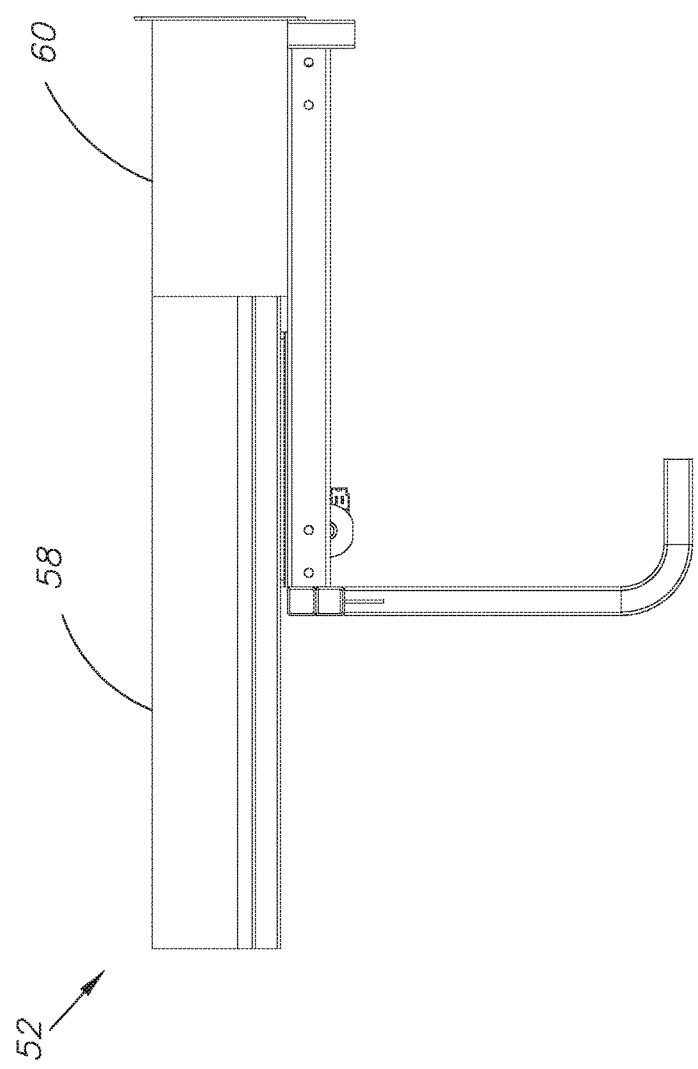
FIG. 20 is a side elevational view thereof.
Figure 21:
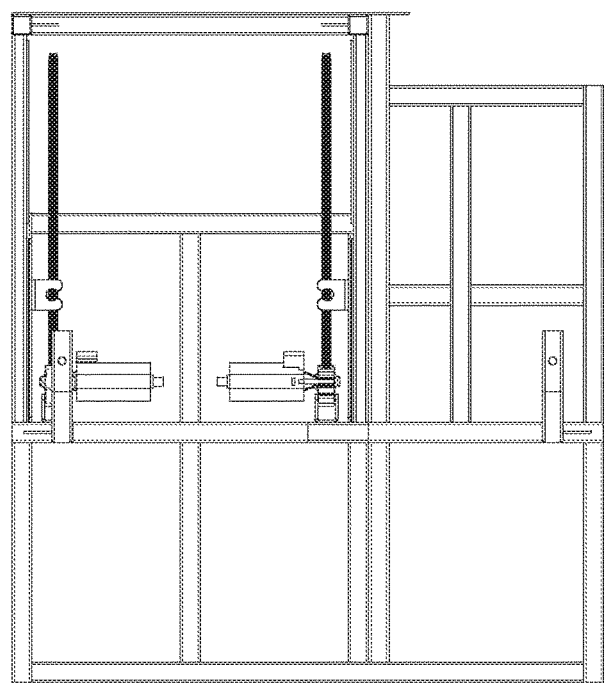
FIG. 21 is a bottom plan view thereof.
Figure 22:
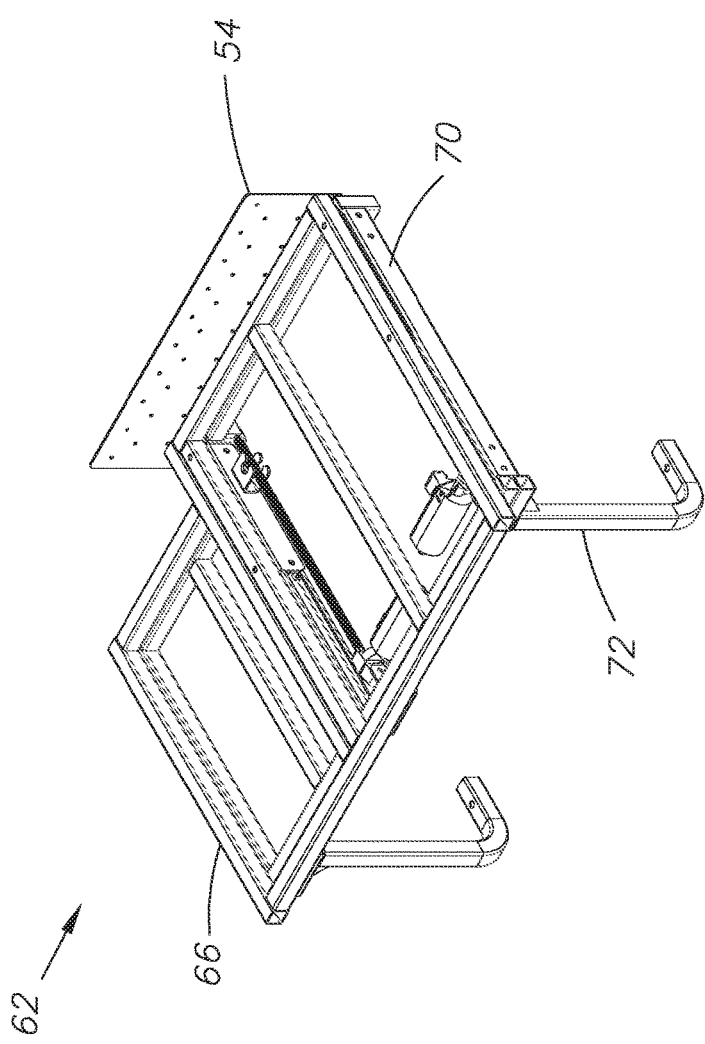
FIG. 22 is a three-dimensional isometric view of a leg frame element thereof.
Figure 23:
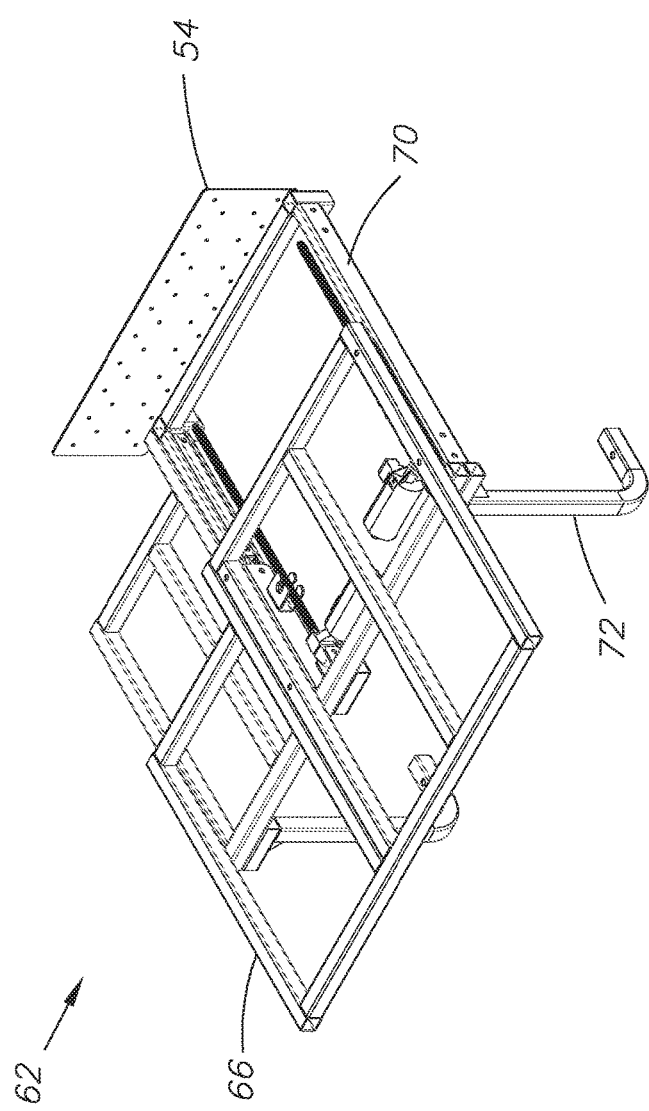
FIG. 23 is a three-dimensional isometric view of the leg frame element of FIG. 18 shown in an extended orientation.

As shown in FIGS. 12-23, an alternative embodiment side-facing sliding seat assembly, shown here as a passenger side of a vehicle side-facing sliding seat assembly 52, which can be transformed from a seat as shown in FIG. 12 to an extended configuration as shown in FIG. 19, which provides a larger sleeping surface when combined with a sofa-bed assembly. The side-facing sliding seat assembly 52 generally includes a leg assembly 62, a cushion 58, and a mounting bracket 54. The leg assembly 62 includes the legs 72 and a slide rail 70 for allowing extension of the entire assembly. The leg 22 allows for installation over a wheel well, and could be removed such that the remaining assembly may be installed directly onto a cabinet within the vehicle. This embodiment could be used when the passenger side of a vehicle differs from the driver's side and requires a cutout or additional modular cushions.

Figure 13:
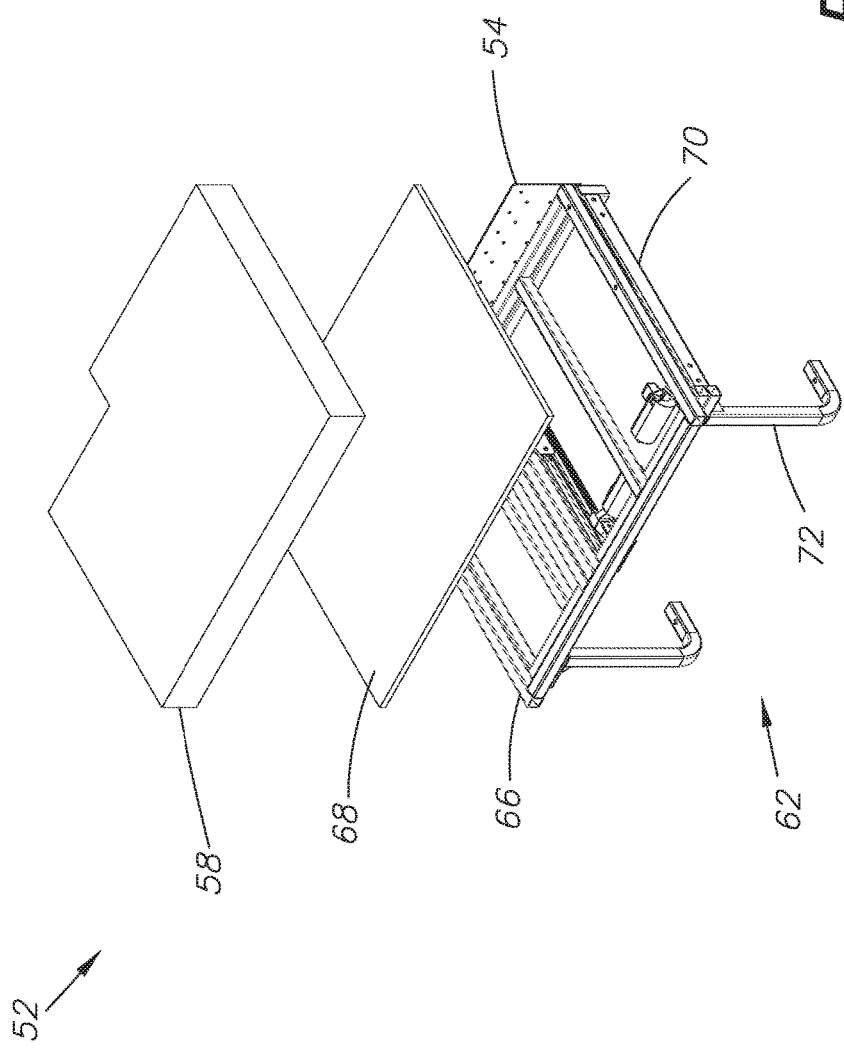
FIG. 13 is an exploded three-dimensional isometric view thereof.
Figure 14:
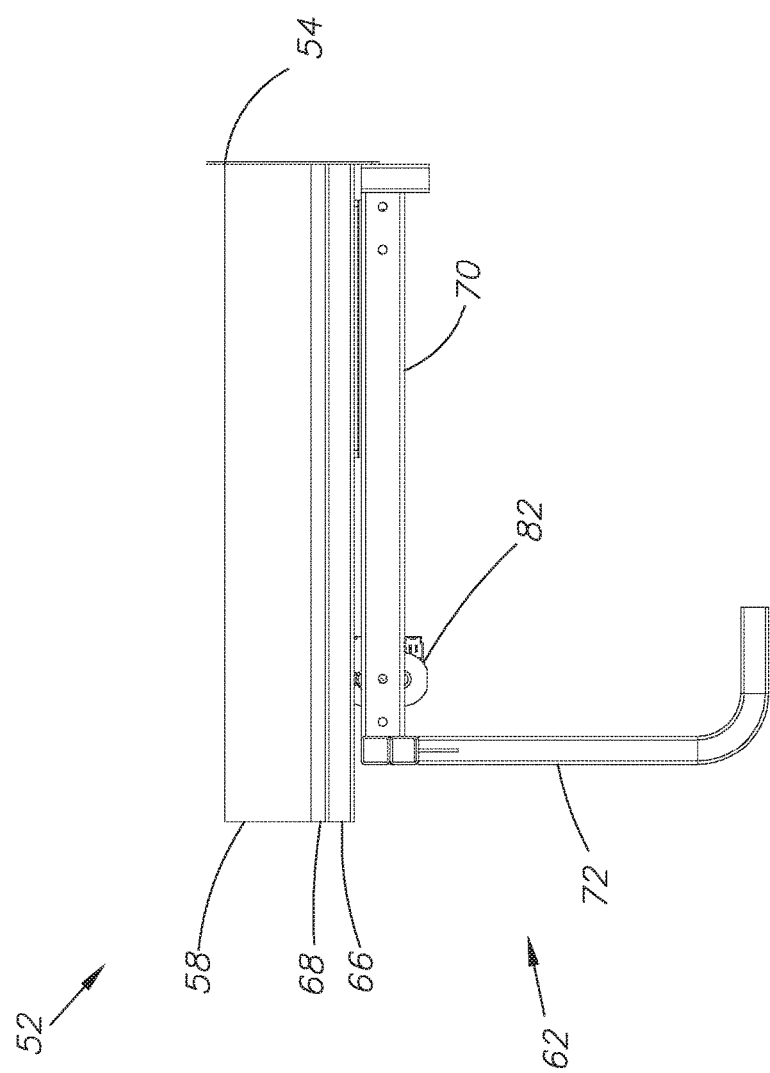
FIG. 14 is a side elevational view thereof.
Figure 15:
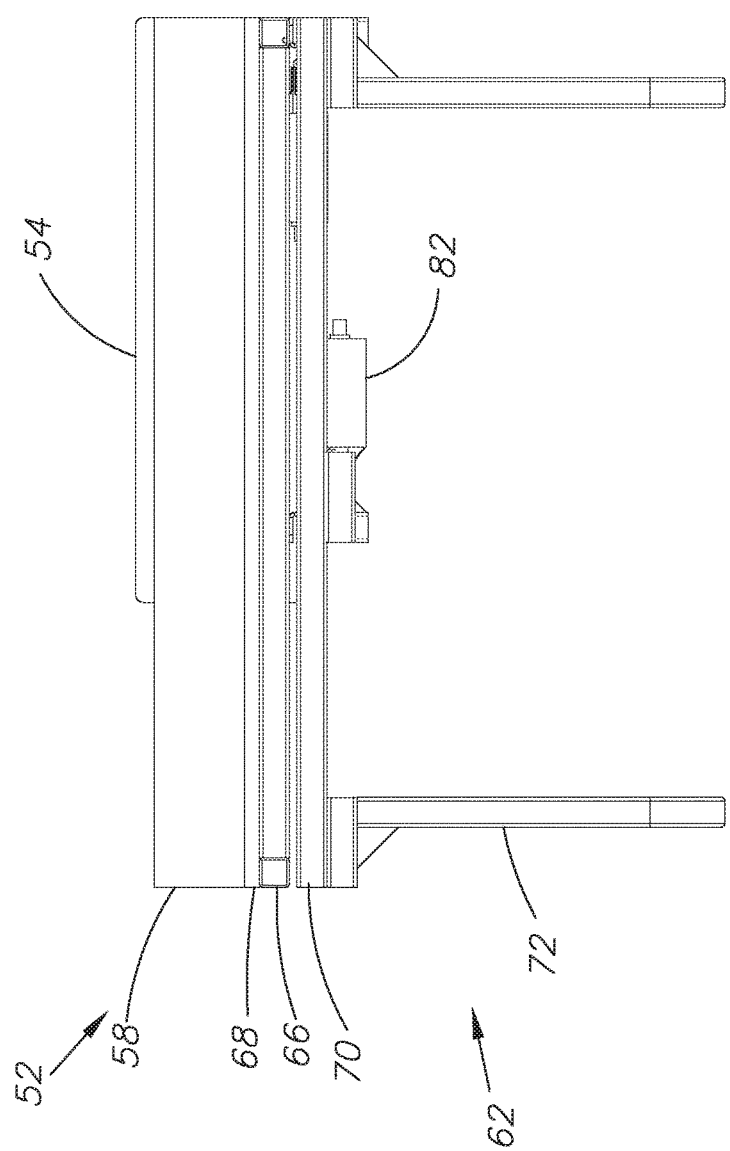
FIG. 15 is a front elevational view thereof.
Figure 16:
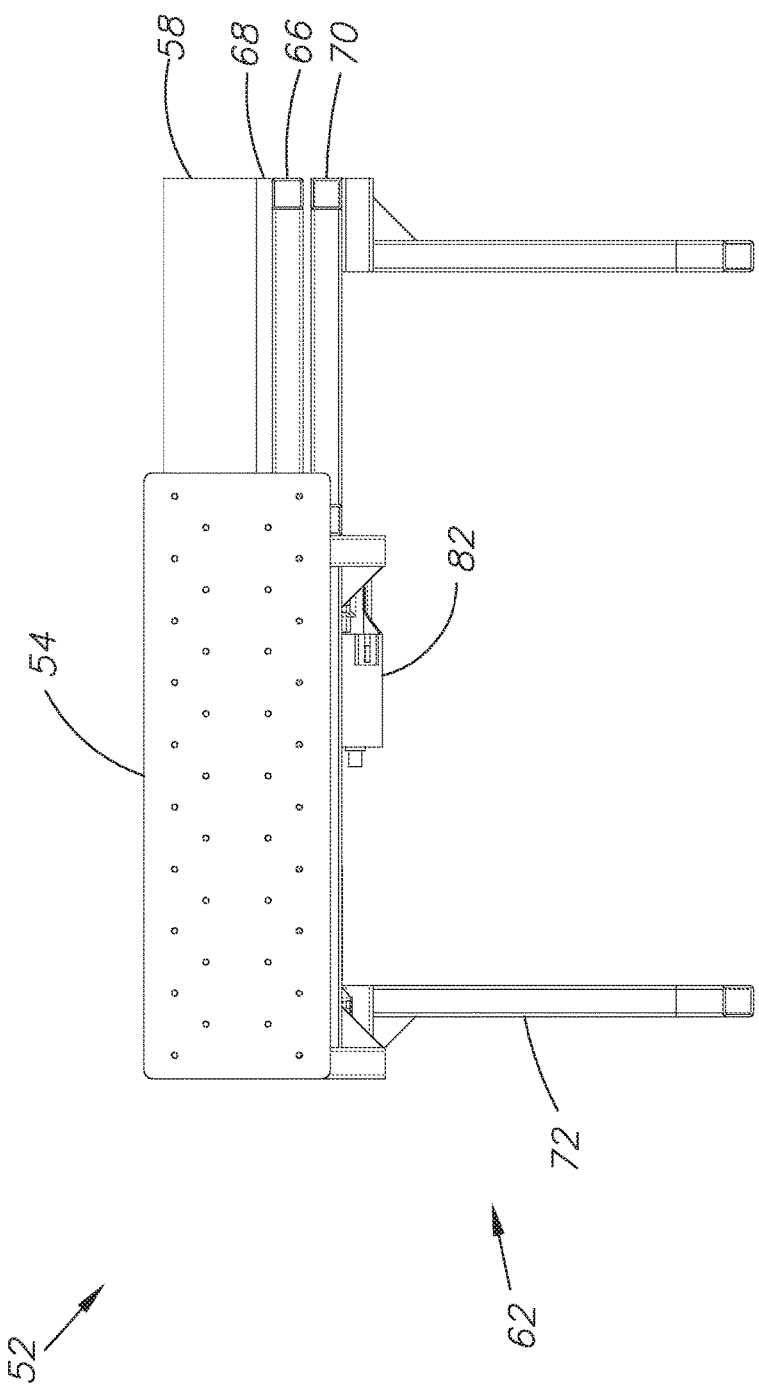
FIG. 16 is a rear elevational view thereof
Figure 17:
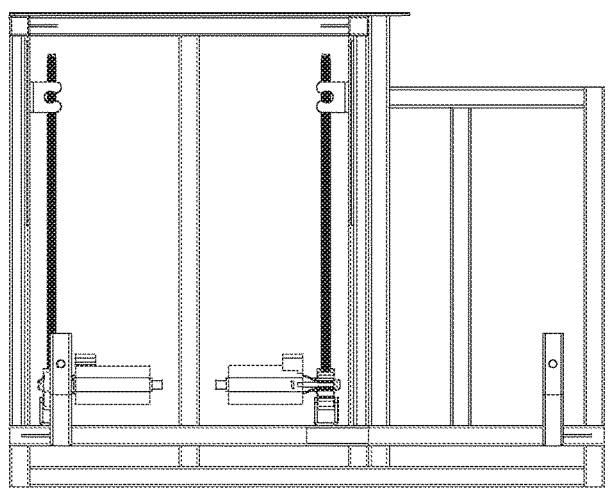
FIG. 17 is a bottom plan view thereof.

FIG. 13 shows how the slide 66 mounts to the slide rail 70, and underneath of the support plate 68 and cushion 58, which allows the transformation of the side-facing sliding seat assembly 52. When extended as shown in FIG. 18, a gap is formed which can be filled with modular cushions 60, 61, providing a larger surface which, when combined with the driver-side seat assembly 2 and a sofa-bed, provides a larger sleep surface within the vehicle. This is shown in more detail in FIGS. 33-44

The entire side-facing sliding seat assembly 52 could be transformed from the first configuration to the second configuration using manual controls or via a powered control. The side-facing sliding seat assembly could be connected to the power of the vehicle and a switch or other controls could be used to mechanically transform the side-facing sliding seat assembly between configurations. The motor 84 controls the physical movement of the side-facing sliding seat assembly slide when transforming between configurations. A power source 80 which is activated by a switch or control 82 would signal the motor to move the pieces of the side-facing sliding seat assembly 52. The motor 84 could be placed in any orientation to allow for installation of elements beneath the side-facing sliding seat assembly 2.

This side-facing sliding seat assembly could be installed across from the previous embodiment side-facing sliding seat assembly 2 in a vehicle. When the two are extended, the cushions 8, 58 of the two respective side-facing sliding seats are pressed together in the center of the vehicle and form no gap for a continuous surface.

IV. Alternative Embodiment Box Slide Side-Facing Sliding Seat Assembly 102

As shown in FIGS. 24-32, an alternative embodiment side-facing sliding seat assembly 102 can be placed on a constructed cabinet element 122 in lieu of the leg elements 22, 72 of the previous embodiments. This would be used in vehicles where cabinets are built over the wheel wells or where the wheel wells are not intruding on the space within the rear area of the van.

Otherwise these side-facing sliding seat assemblies 102 function nearly identically to the previous embodiments. The side-facing sliding seat assembly 102 generally includes a base assembly 112, a cushion 108, and a mounting bracket 104. A slide rail 120 affixed to a slide plate 121 allows for extension of the entire assembly and would be mounted to the cabinet 122.

Figure 25:
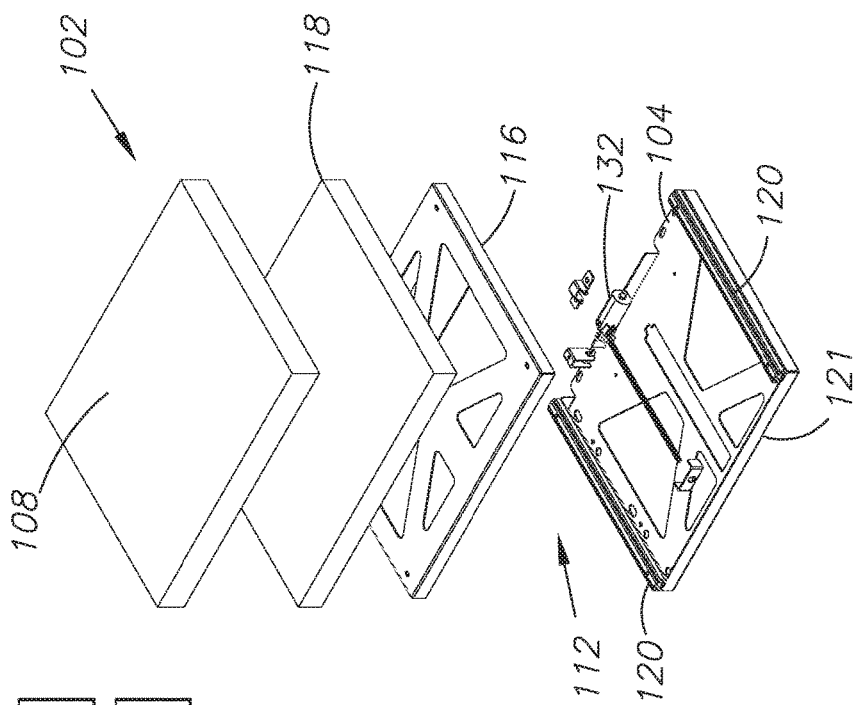
FIG. 25 is an exploded isometric view thereof.
Figure 24:
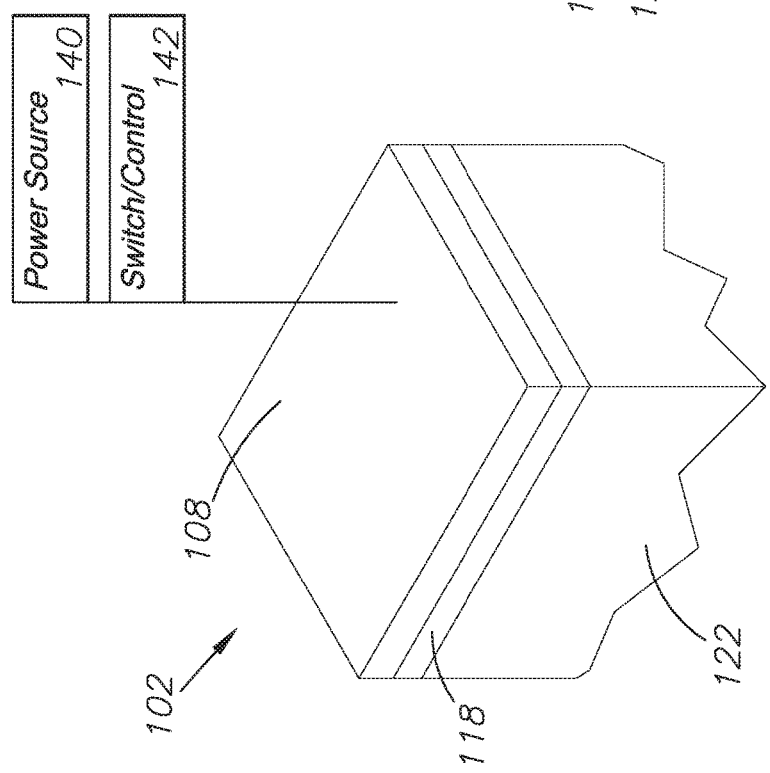
FIG. 24 is a three-dimensional isometric view of an alternative embodiment of the present invention shown in combination with a built-in cabinet element.
Figure 28:
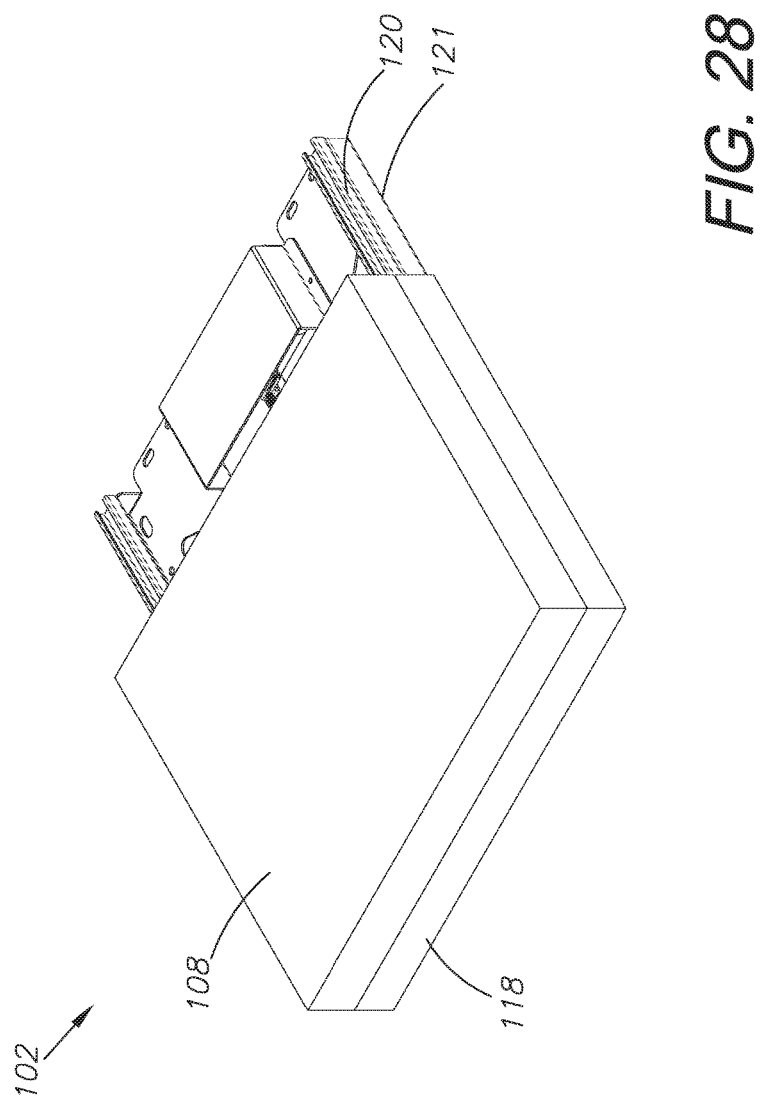
FIG. 28 is a three-dimensional isometric view thereof shown in an extended orientation with a gap for a modular cushion.
Figure 29:
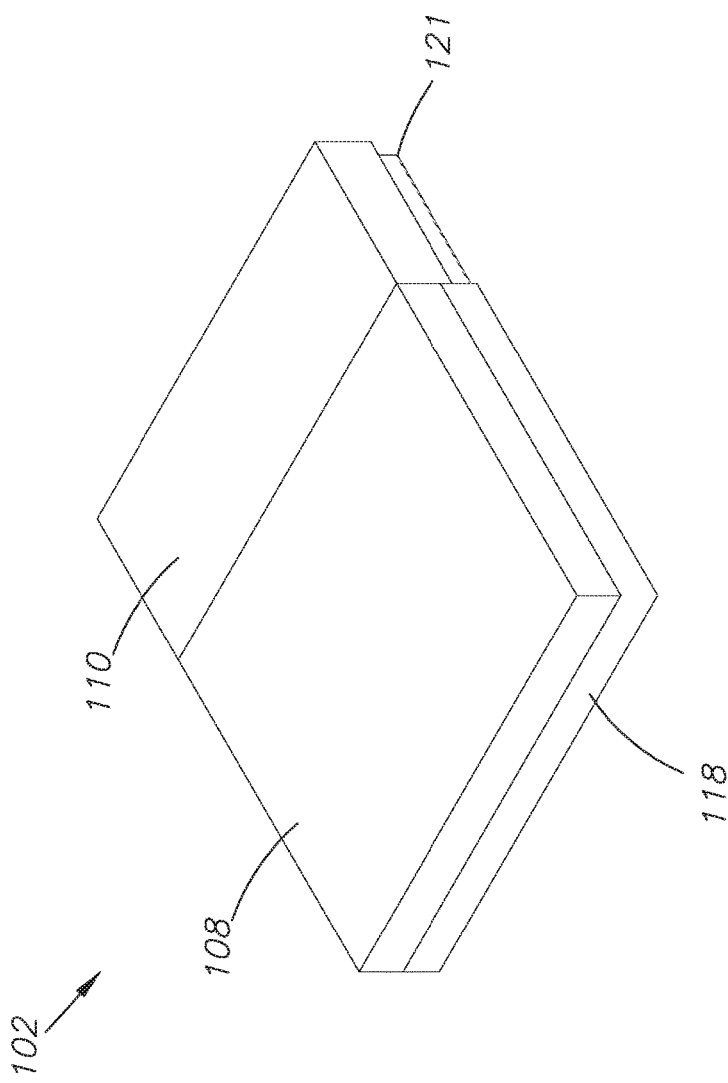
FIG. 29 is a three-dimensional isometric view thereof shown with a modular cushion inserted into the gap.
Figure 30:
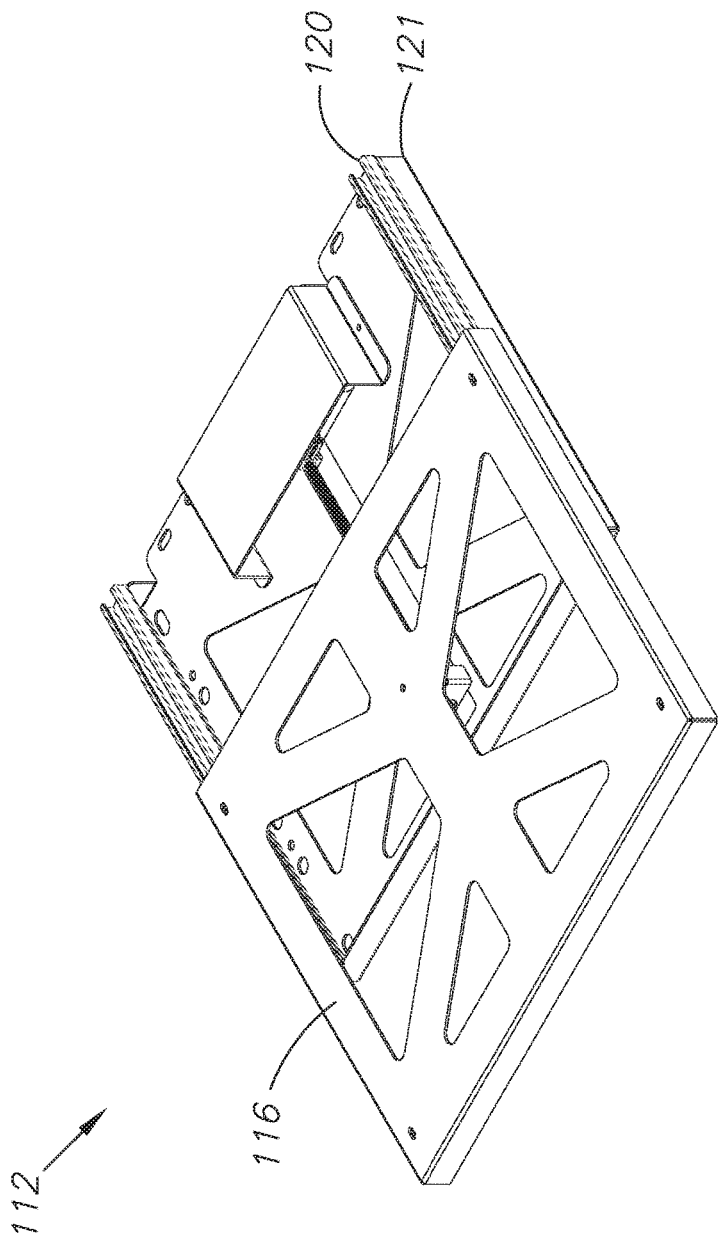
FIG. 30 is a three-dimensional isometric view of a frame element thereof shown in an extended orientation.
Figure 31:
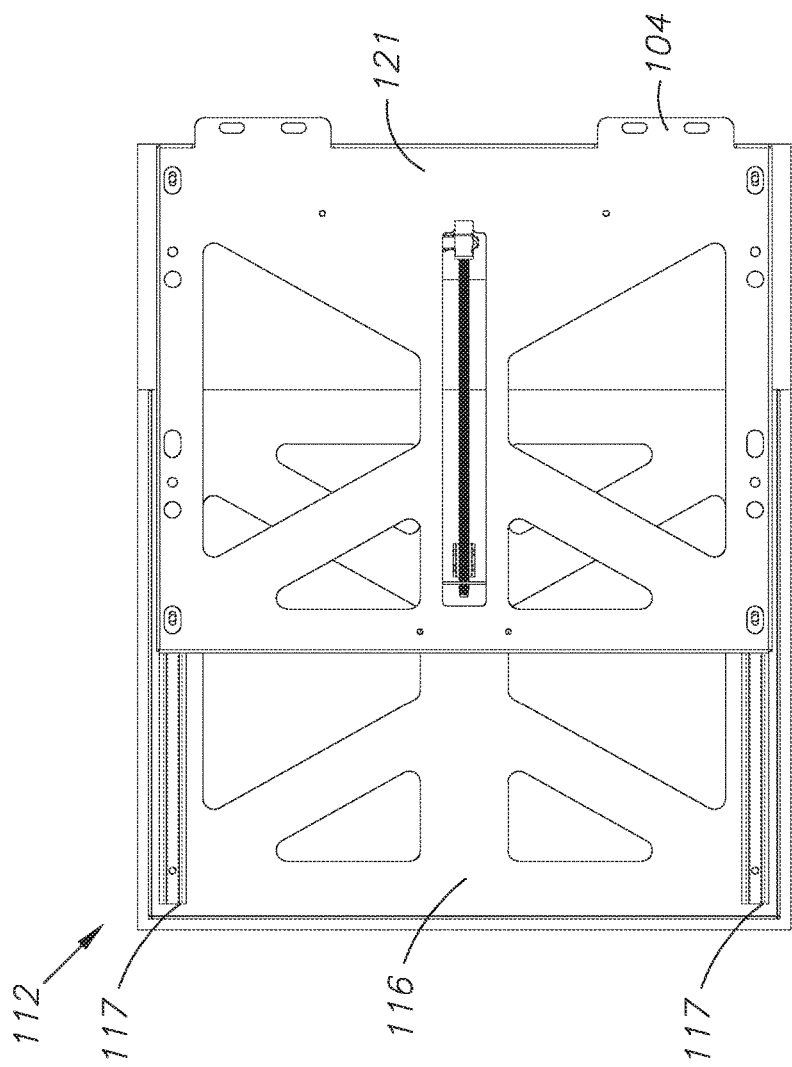
FIG. 31 is a top plan view thereof.
Figure 32:
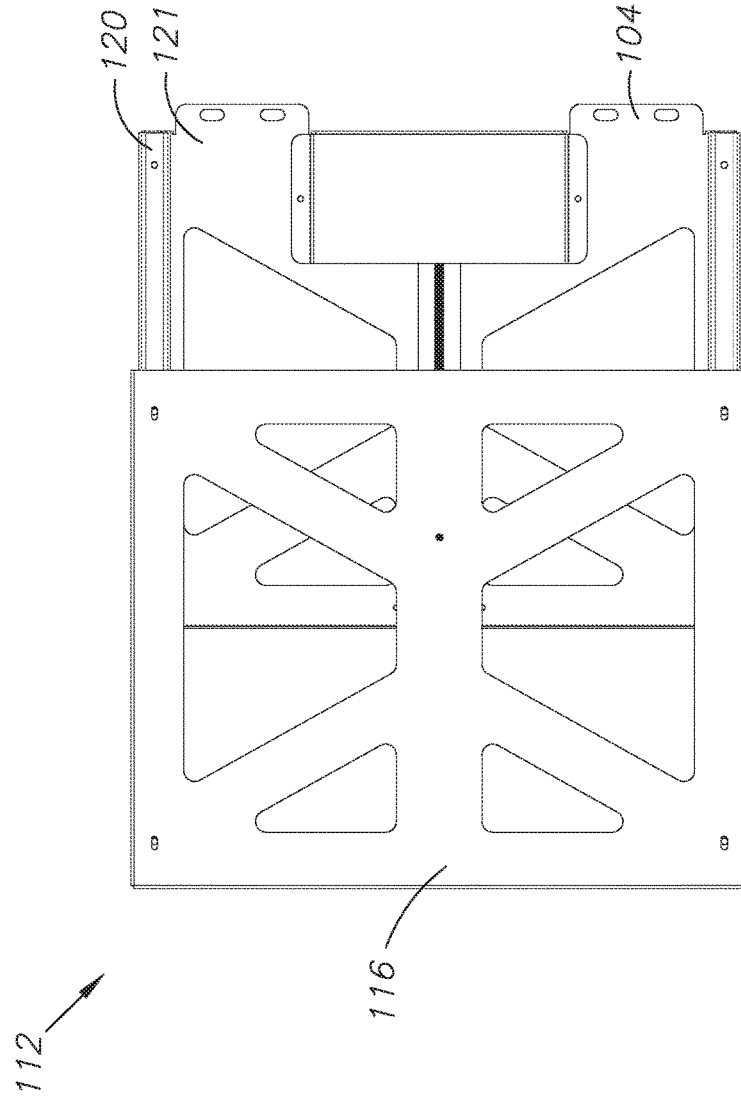
FIG. 32 is a bottom plan view thereof.

FIG. 25 shows how the slide 116 mounts to the slide rail 120, and underneath of the support plate 118 and cushion 108, which allows the transformation of the side-facing sliding seat assembly 102. When extended as shown in FIG. 28, a gap is formed which can be filled with a modular cushion 110 as shown in FIG. 29, providing a larger surface which, when combined with a second side seat assembly 52 and a sofa-bed, provides a larger sleep surface within the vehicle. This is shown in more detail in FIGS. 33-44.

The entire side-facing sliding seat assembly 102 could be transformed from the first configuration to the second configuration using manual controls or via a powered control. The side-facing sliding seat assembly could be connected to the power of the vehicle and a switch or other controls could be used to mechanically transform the side-facing sliding seat between configurations. The motor 132 controls the physical movement of the side-facing sliding seat assembly slide when transforming between configurations. A power source 140 which is activated by a switch or control 142 would signal the motor to move the pieces of the side-facing sliding seat assembly 102. The motor 132 could be placed in any orientation to allow for installation of elements beneath the side-facing sliding seat assembly 102.

Two such side-facing sliding seat assemblies could be installed across from one another in a vehicle. The two could be identical, or could feature a slightly alternative embodiment as required by the additional features of the vehicle interior. When the two are extended, the cushions 108 of the two respective side-facing sliding seats are pressed together in the center of the vehicle and form no gap for a continuous surface.

V. Vehicle Assembly 202 Embodiment with Sofa Bed 206

Figure 33:
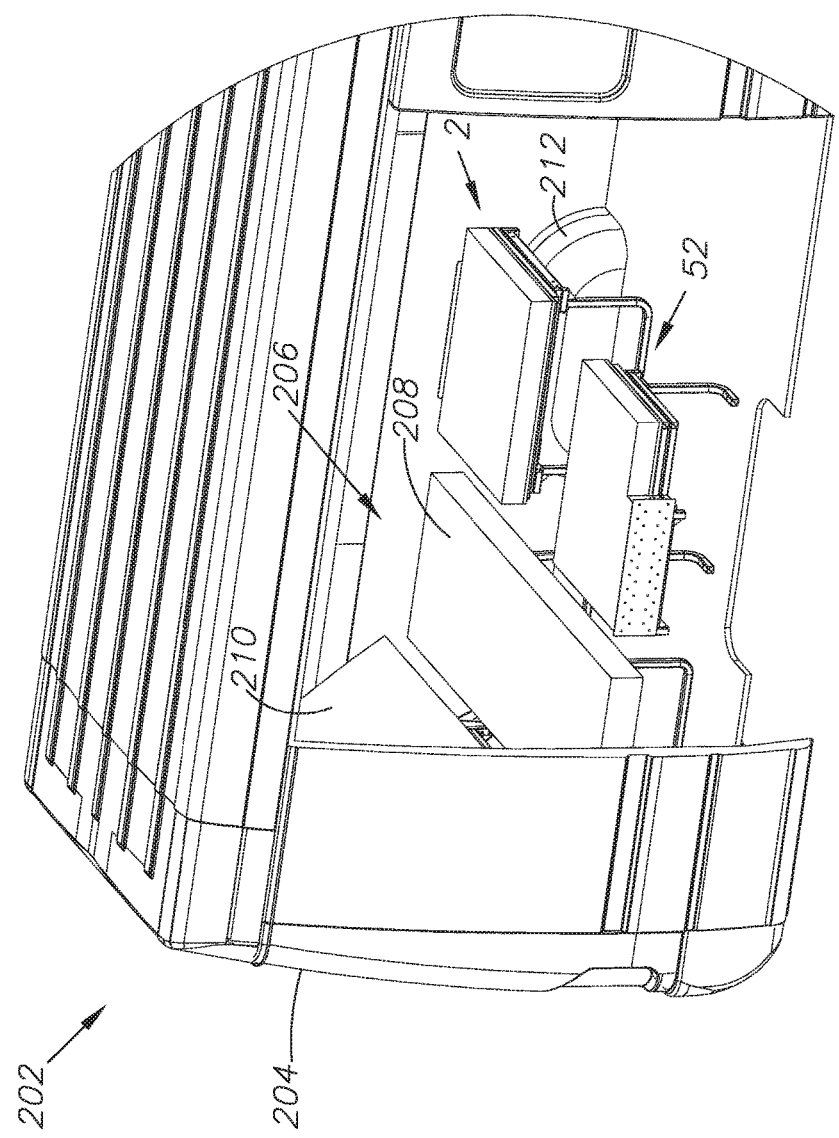
FIG. 33 is a three-dimensional view of a system incorporating elements of the embodiment of FIGS. 1-23 shown in combination with a sofa bed assembly installed within a van.
Figure 34:
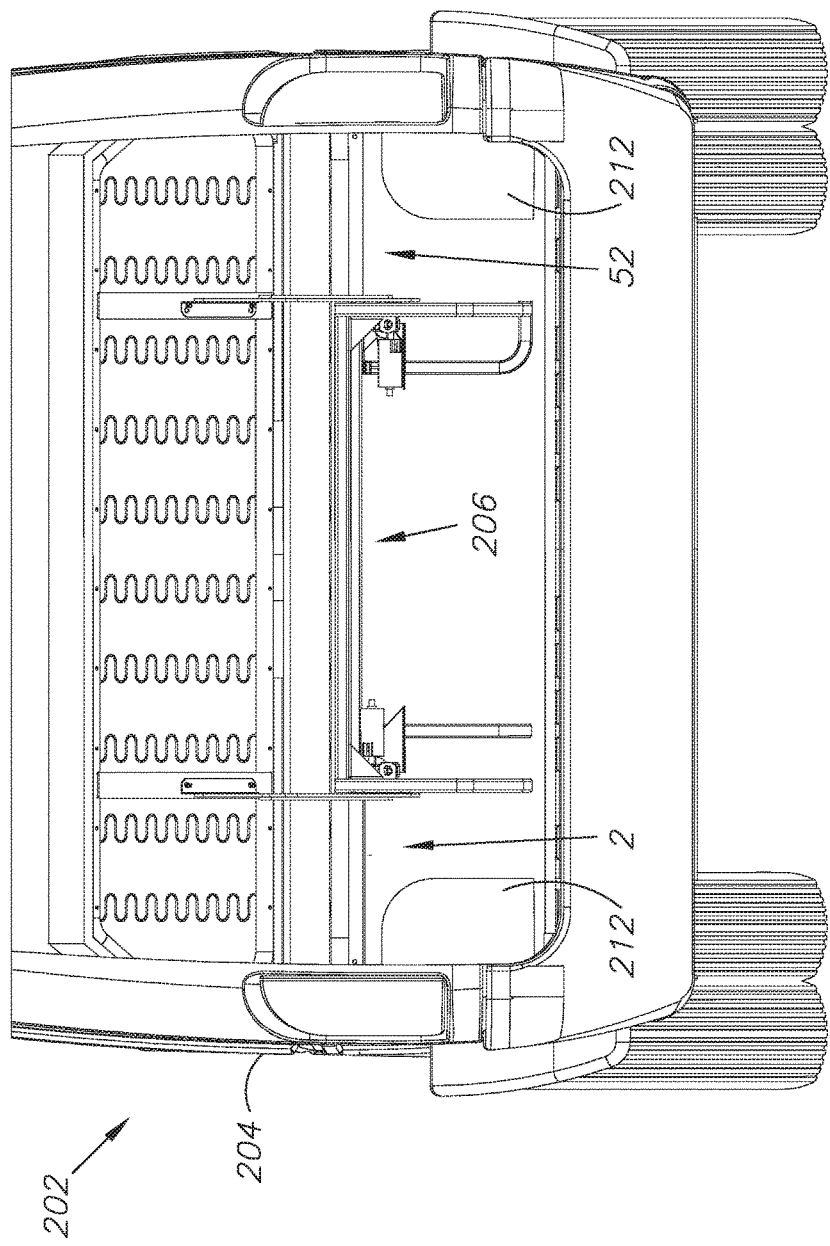
FIG. 34 is a rear elevational view thereof.

FIGS. 33-36 show a vehicle assembly 202 for being installed within a van 204 where the first side seat assembly 2 and second side seat assembly 52 are installed within the interior of the van in proximity to a sofa bed assembly 206 which has a seat portion 208 and a rear portion 210. This sofa bed assembly preferably is the sofa bed assembly of U.S. patent application Ser. No. 16/115,702, filed Aug. 29, 2018 and owned by the same entity as the Applicant of the present application, which is incorporated herein by reference. As can be seen in FIGS. 33 and 34, the side seat assemblies 2, 52 are installed over the wheel wells 212.

Figure 35:
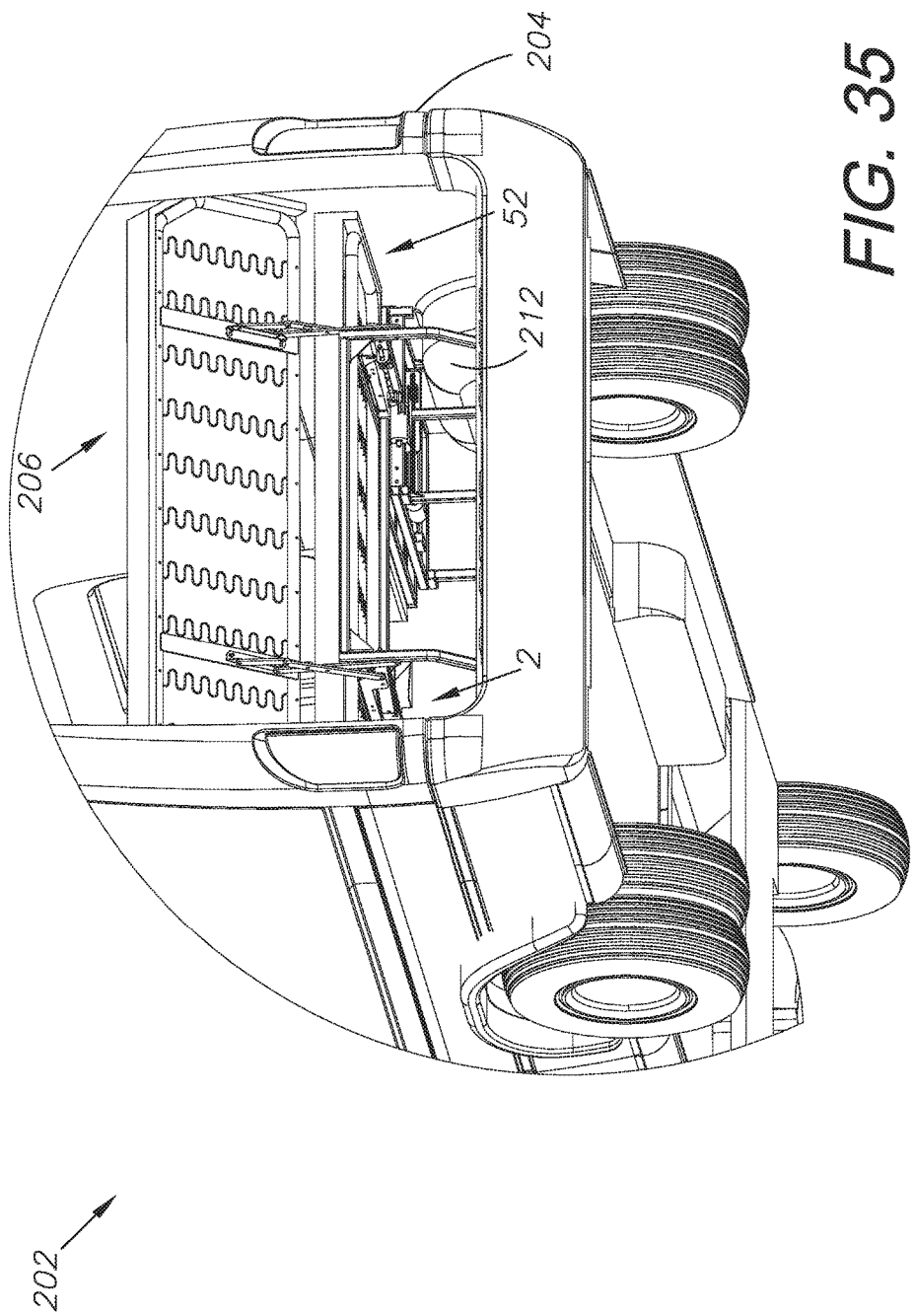
FIG. 35 is another three-dimensional view thereof.
Figure 36:
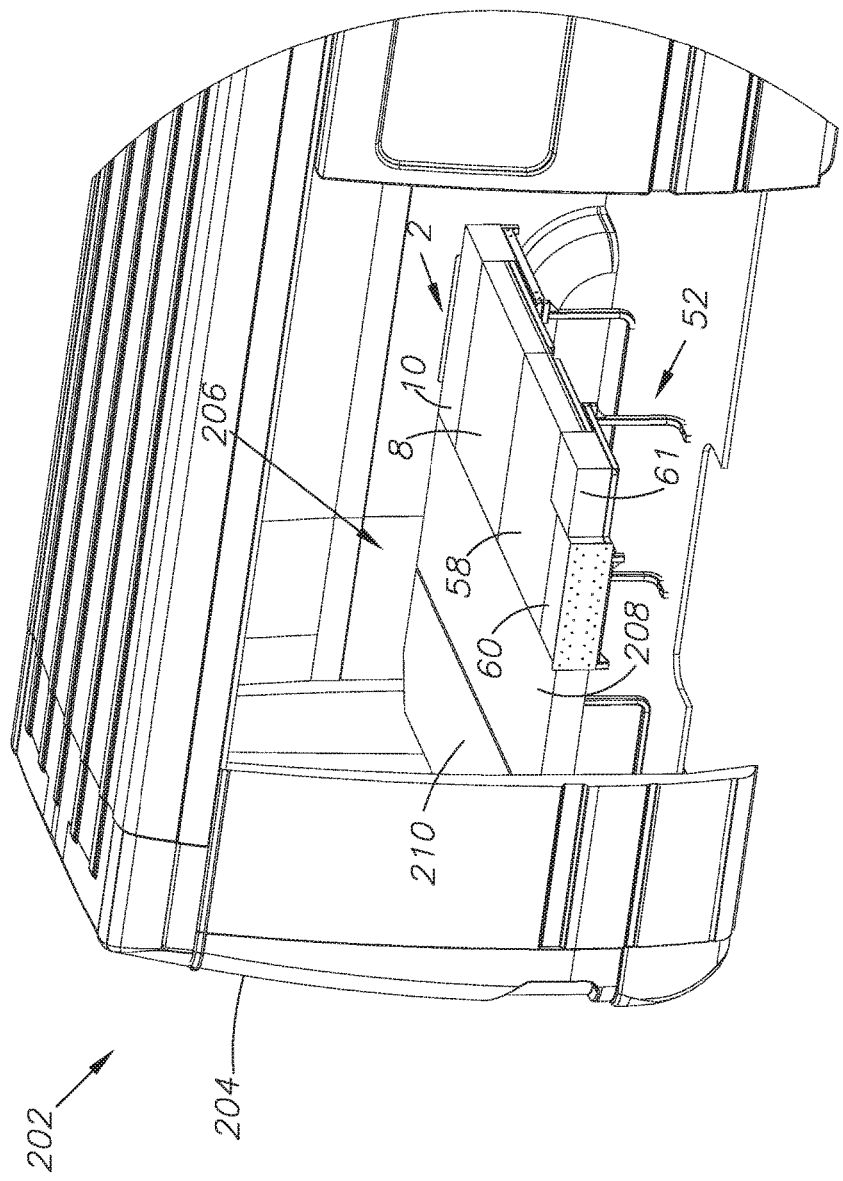
FIG. 36 is a three-dimensional view thereof shown in an extended and flattened orientation.
Figure 37:
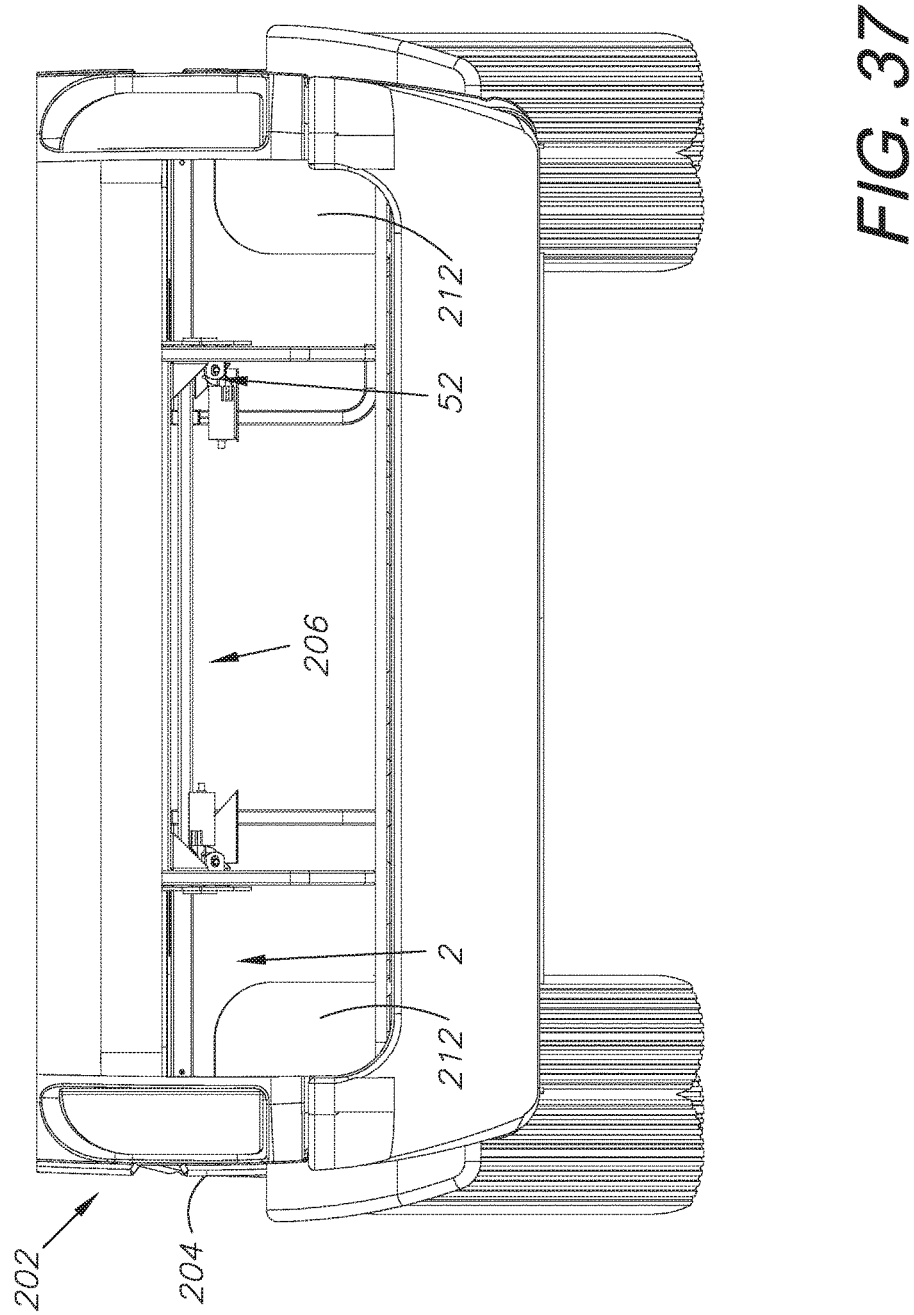
FIG. 37 is a rear elevational view thereof.
Figure 38:
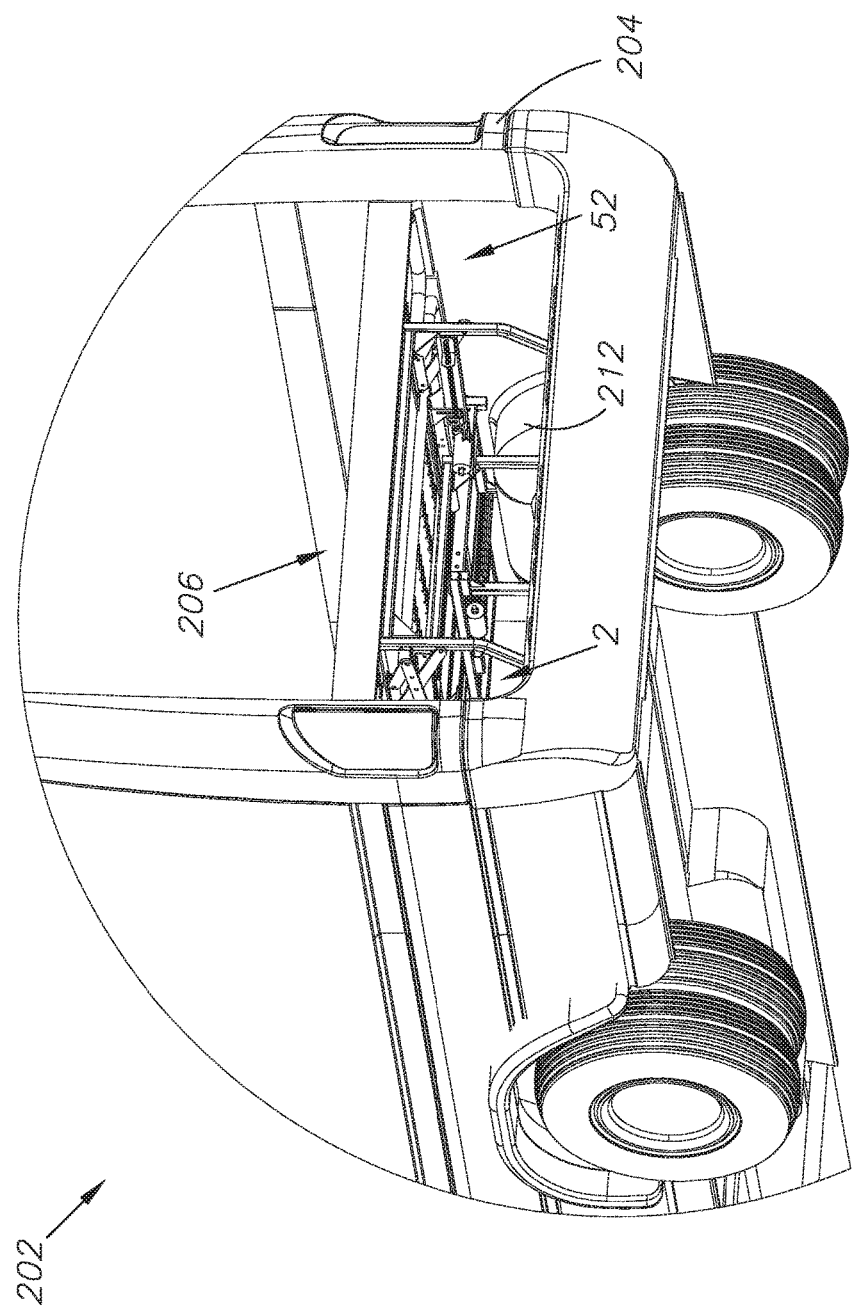
FIG. 38 is another three-dimensional view thereof.

FIGS. 33-35 show how the side-facing sliding seat assemblies 2, 52 and the sofa bed assembly 206 would be positioned in a first, upright orientation designed for sitting within the rear portion of the van. FIGS. 36-38 show how the side seat assemblies 2, 52 and sofa bed assembly 206 would be positioned in a second, sleeping-area configuration where the side-facing sliding seat assemblies 2, 52 are extended and the sofa bed assembly 206 is in a laid-flat orientation.

VI. Vehicle Assembly 302 Embodiment with Sofa Bed 206

Similar to the embodiment above, FIGS. 39-44 show an alternative embodiment vehicle assembly 302 in a different sized van 304 which includes a similar sofa bed assembly 206, but which also includes the third embodiment side seat assemblies 102 installed in proximity with the sofa bed assembly.

Figure 39:
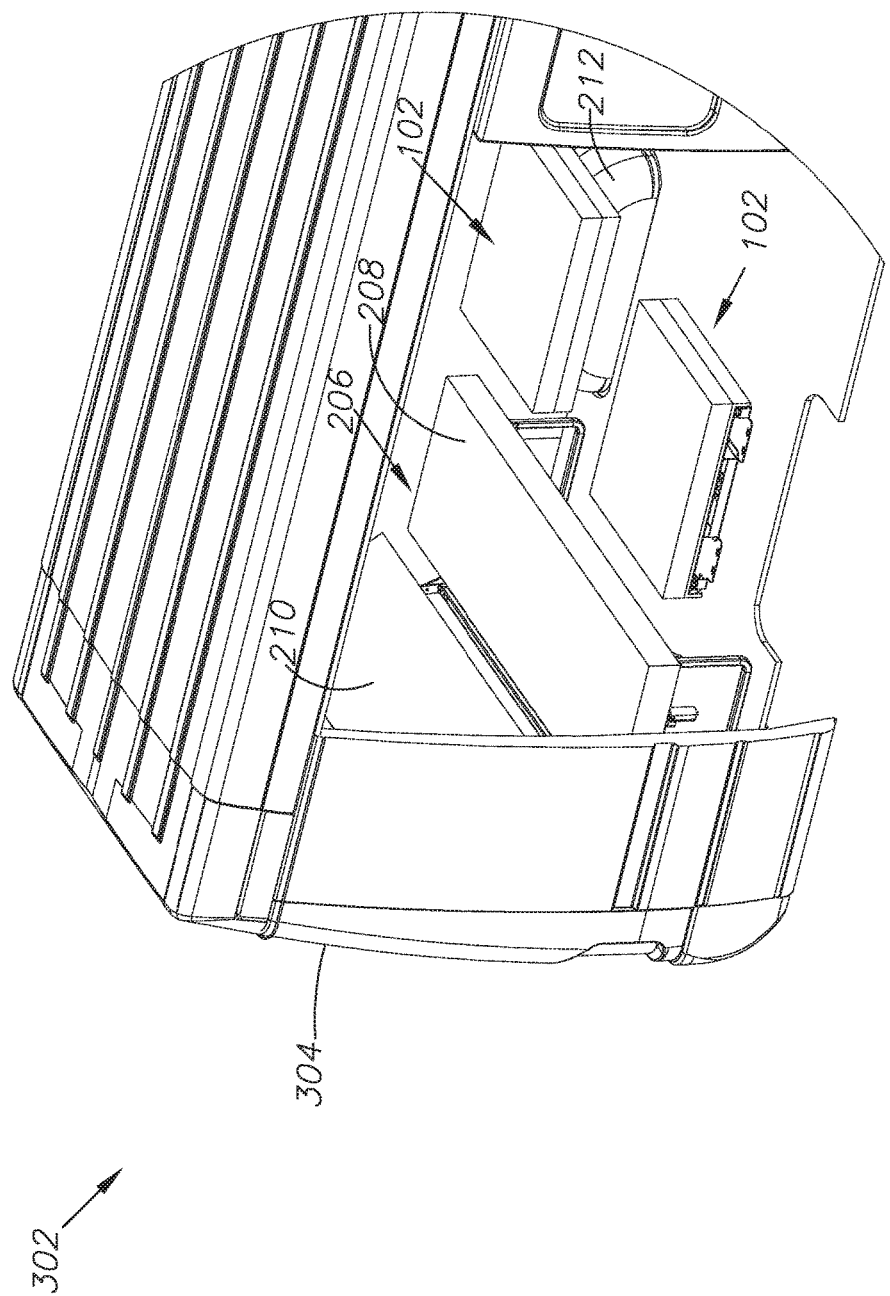
FIG. 39 is a three-dimensional view of a system incorporating elements of the embodiment of FIGS. 24-33 shown in combination with a sofa bed assembly installed within a van.
Figure 40:
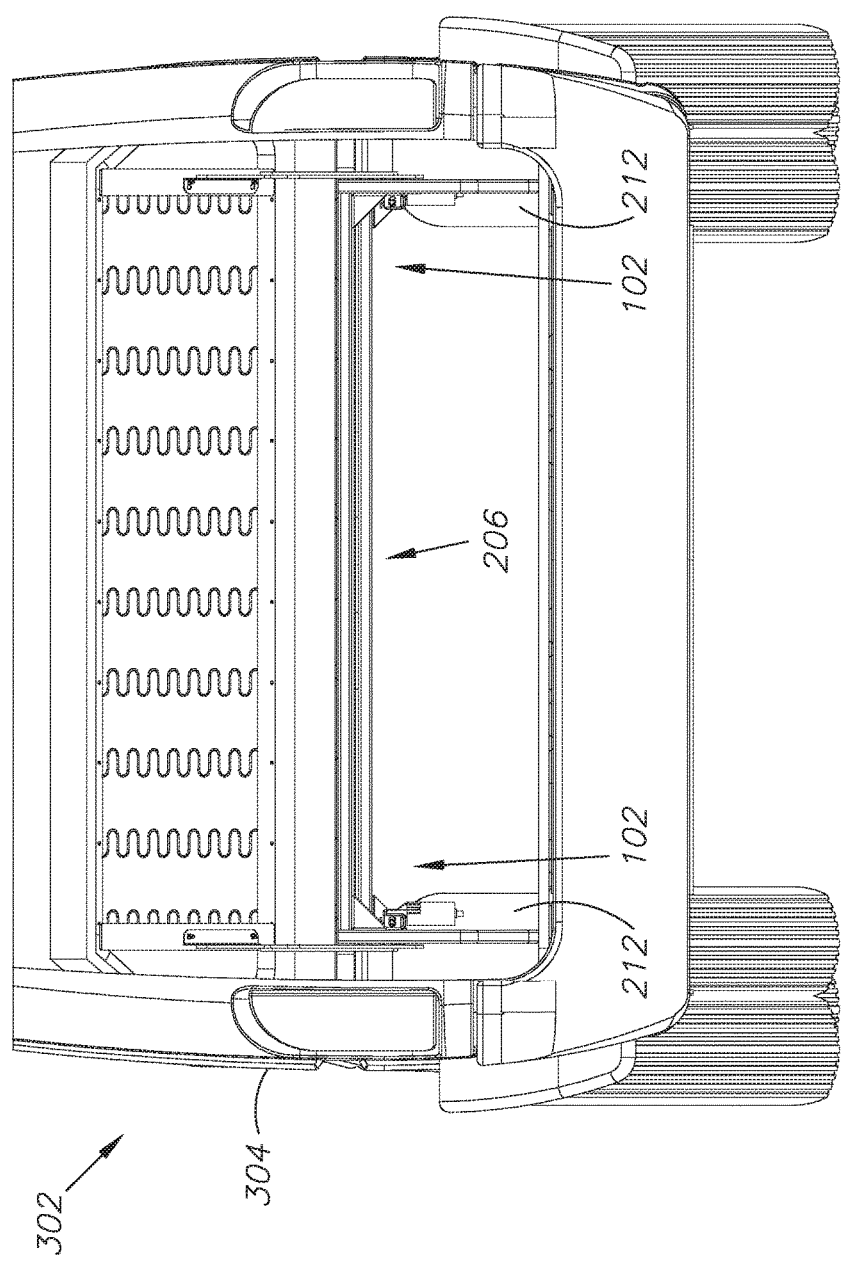
FIG. 40 is a rear elevational view thereof.
Figure 41:
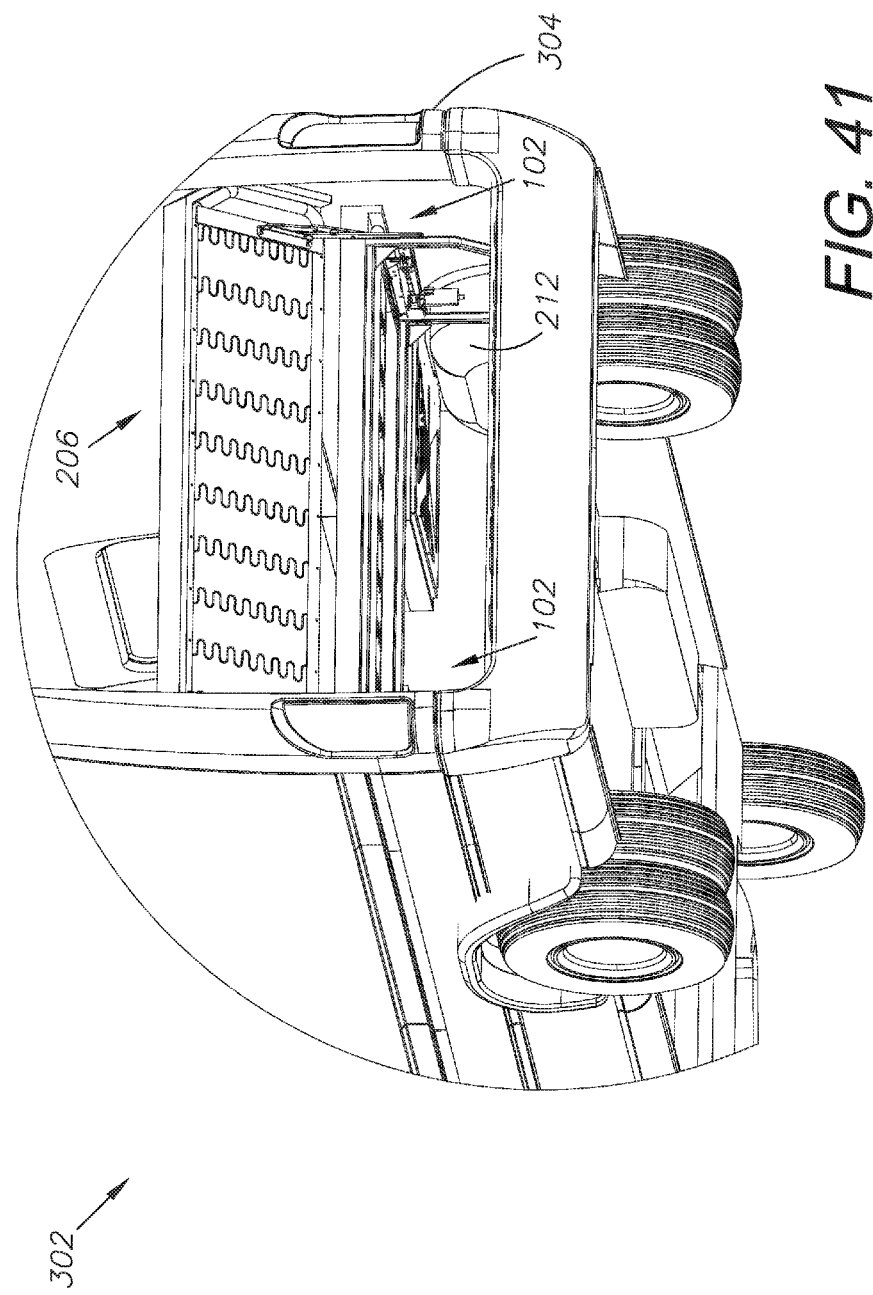
FIG. 41 is another three-dimensional view thereof.
Figure 42:
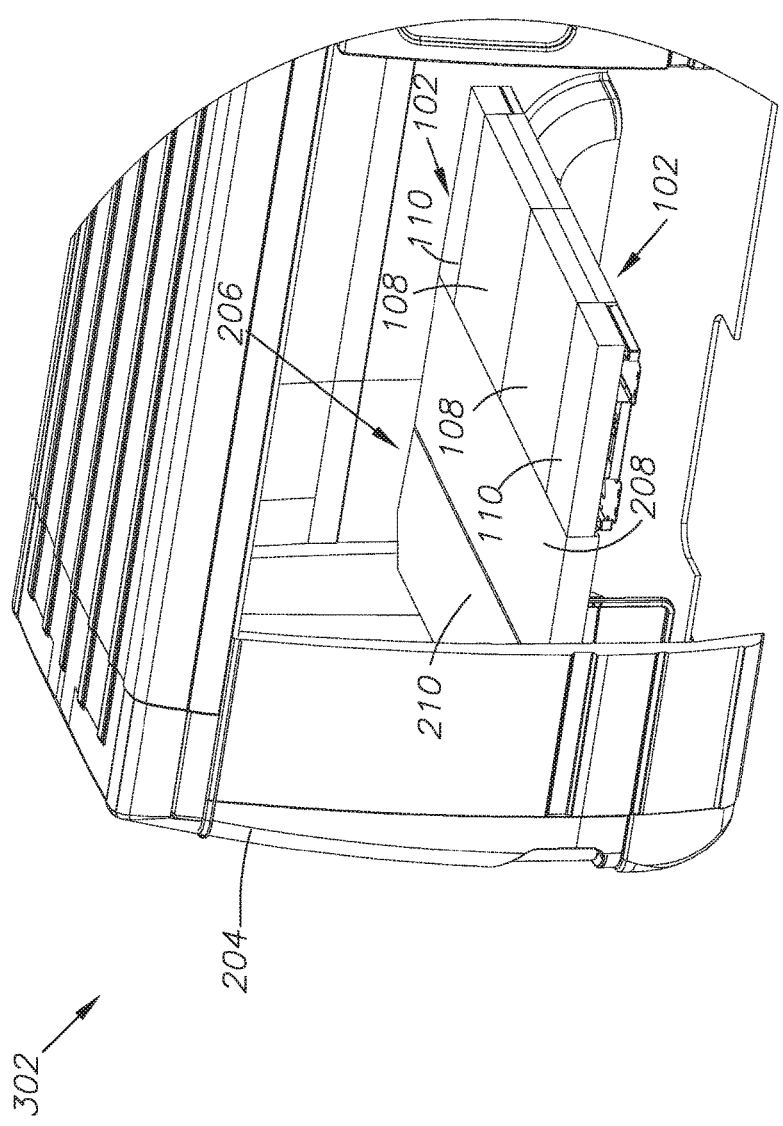
FIG. 42 is a three-dimensional view thereof shown in an extended and flattened orientation.

FIGS. 39-41 show how the side-facing sliding seat assemblies 102 and the sofa bed assembly 206 would be positioned in a first, upright orientation designed for sitting within the rear portion of the van. FIGS. 42-44 show how the side seat assemblies 102 and sofa bed assembly 206 would be positioned in a second, sleeping-area configuration where the side-facing sliding seat assemblies 102 are extended and the sofa bed assembly 206 is in a laid-flat orientation.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A side-facing sliding seat assembly system for a vehicle, the side-facing sliding seat assembly system comprising:
   a first side-facing sliding seat assembly and a second side-facing sliding seat assembly;
   each of said first and second side-facing sliding seat assemblies comprising a respective base portion connected to a respective seat cushion;
   said first side-facing sliding seat assembly transformable between a first, original seat configuration and a second, extended orientation;
   said second side-facing sliding seat assembly transformable between a first, original seat configuration and a second, extended orientation;
   wherein said seat cushion of said first side-facing sliding seat assembly and said seat cushion of said second side-facing sliding seat assembly mate to form a single flat sleeping surface when each of said first and second side-facing sliding seat assemblies are placed into their respective second, extended orientations;
   a first motor connected to said base of said first side-facing sliding seat assembly;
   a second motor connected to said base of said second side-facing sliding seat assembly;
   each said motor configured to activate said respective slide within said respective slide rail;
   a switch configured to activate at least one of said first and second motors;
   whereby said first motor is further configured to transform said first side-facing sliding seat assembly between said first, original seat configuration and said second, extended configuration; and whereby said second motor is further configured to transform said second side-facing sliding seat assembly between said first, original seat configuration and said second, extended configuration.

2. The side-facing sliding seat assembly of claim 1, further comprising:

a sofa-bed assembly comprising a first, upright orientation and a second, lay-flat orientation;

wherein said seat cushion of said first side-facing sliding seat assembly and said seat cushion of said second side-facing sliding seat assembly mate with said sofa-bed assembly to form a larger single flat congruous sleeping surface when each of said first and second side-facing sliding seat assemblies are placed into their respective second, extended orientations and when said sofa-bed assembly is placed in said second, lay-flat orientation.

3. The side-facing sliding seat assembly of claim 1, further comprising:

each respective base comprising a leg; and each respective leg being affixed to an interior portion of the vehicle.

4. The side-facing sliding seat assembly of claim 1, further comprising a furniture element installed within the vehicle.

5. The side-facing sliding seat assembly system of claim 1, further comprising:

each respective base comprising a seat cushion support structure configured to support said seat cushion;

a slide connected to each respective seat cushion support structure; and each said base including a slide rail for slideably engaging said slide.

6. A side-facing sliding seat assembly system for a vehicle, the side-facing sliding seat assembly system comprising:

a first side-facing sliding seat assembly and a second side-facing sliding seat assembly;

each of said first and second side-facing sliding seat assemblies comprising a respective base portion connected to a respective seat cushion;

said first side-facing sliding seat assembly transformable between a first, original seat configuration and a second, extended orientation;

said second side-facing sliding seat assembly transformable between a first, original seat configuration and a second, extended orientation;

wherein said seat cushion of said first side-facing sliding seat assembly and said seat cushion of said second side-facing sliding seat assembly mate to form a single flat sleeping surface when each of said first and second side-facing sliding seat assemblies are placed into their respective second, extended orientations;

a first gap formed between a wall of the vehicle and said seat cushion of said first side-facing sliding seat assembly when said first side-facing sliding seat assembly is placed in said second, extended orientation;

a first modular cushion configured to be inserted within said first gap;

a second gap formed between a wall of the vehicle and said seat cushion of said second side-facing sliding seat assembly when said first side-facing sliding seat assembly is placed in said second, extended orientation;

a second modular cushion configured to be inserted within said second gap; and each of said first and second modular cushions, said first side-facing sliding seat assembly seat cushion, and said second side-facing sliding seat assembly seat cushion forming an extended, flat, congruous sleeping surface.

7. A vehicle side-facing sliding seat assembly system, the system comprising:

a first side-facing sliding seat assembly comprising a base portion, a slide rail connected to said base portion, a support portion, a slide connected to said support portion, and a seat cushion;

a second side-facing sliding seat assembly comprising a base portion, a slide rail connected to said base portion, a support portion, a slide connected to said support portion, and a seat cushion;

said first side-facing sliding seat assembly transformable between a first, original seat configuration and a second, extended orientation;

said second side-facing sliding seat assembly transformable between a first, original seat configuration and a second, extended orientation;

wherein said seat cushion of said first side-facing sliding seat assembly contacts and rests adjacent to said seat cushion of said second side-facing sliding seat assembly when both of said first side-facing sliding seat assembly and said second side-facing sliding seat assembly are in their respective extended orientation, thereby forming a flat, congruous surface;

a first motor connected to said base portion of said first side-facing sliding seat assembly, said first motor configured to activate said slide within said slide rail of said first side-facing sliding seat assembly;

a second motor connected to said base portion of said second side-facing sliding seat assembly, said second motor configured to activate said slide within said slide rail of said second side-facing sliding seat assembly;

whereby said first motor is further configured to transform said first side-facing sliding seat assembly between said first, original seat configuration and said second, extended configuration; and whereby said first motor is further configured to transform said second side-facing sliding seat assembly between said first, original seat configuration and said second, extended configuration.

8. The side-facing sliding seat assembly of claim 7, further comprising:

said base comprising a leg; and said leg being affixed to an interior portion of the vehicle.

9. The side-facing sliding seat assembly of claim 7, further comprising a furniture element installed within the vehicle.

10. The system of claim 7, further comprising:

said first side-facing sliding seat assembly comprising a driver's side side-facing sliding seat assembly; and said second seat-assembly comprising a passenger's side side-facing sliding seat assembly.

11. A vehicle side-facing sliding seat assembly system, the system comprising:

a first side-facing sliding seat assembly comprising a base portion, a slide rail connected to said base portion, a support portion, a slide connected to said support portion, and a seat cushion;

a second side-facing sliding seat assembly comprising a base portion, a slide rail connected to said base portion, a support portion, a slide connected to said support portion, and a seat cushion;

said first side-facing sliding seat assembly transformable between a first, original seat configuration and a second, extended orientation;
said second side-facing sliding seat assembly transformable between a first, original seat configuration and a second, extended orientation;
wherein said seat cushion of said first side-facing sliding seat assembly contacts and rests adjacent to said seat cushion of said second side-facing sliding seat assembly when both of said first side-facing sliding seat assembly and said second side-facing sliding seat assembly are in their respective extended orientation, thereby forming a flat, congruous surface;
a sofa-bed assembly comprising a back cushion, a sofa cushion, and a frame;
said sofa-bed assembly transformable between a first, sofa configuration and a second, bed configuration, wherein when in said second, bed configuration said sofa cushion and said rear cushion a placed adjacent to each other and are in a laid-flat configuration; and
wherein said sofa cushion rests adjacent to said first side-facing sliding seat assembly cushion and said second side-facing sliding seat assembly cushion when said sofa-bed assembly is in said second, bed configuration, thereby forming a flat, congruous surface between said sofa cushion, and first side-facing sliding seat assembly cushion; and said second side-facing sliding seat assembly cushion.

12. The system of claim 11, further comprising:
a first gap formed between a first wall of the vehicle and said first side-facing sliding seat assembly cushion when said first side-facing sliding seat assembly is placed in said second, extended orientation;
a second gap formed between a second wall of the vehicle and said second side-facing sliding seat assembly cushion when said second side-facing sliding seat assembly is placed in said second, extended orientation;
a first modular cushion configured to be inserted within said first gap;
a second modular cushion configured to be inserted within said second gap; and
wherein said first modular cushion and said second modular cushion form a flat, congruous surface with said sofa cushion, said first side-facing sliding seat assembly cushion, and said second side-facing sliding seat assembly cushion.

13. A method of deploying transformable furniture within a vehicle, the method comprising the steps:
installing a first side-facing sliding seat assembly within a vehicle, said first side-facing sliding seat assembly comprising a base portion, a slide rail connected to said base portion, a support portion, a slide connected to said support portion, and a seat cushion;
installing a second side-facing sliding seat assembly, said second side-facing sliding seat assembly comprising a base portion, a slide rail connected to said base portion, a support portion, a slide connected to said support portion, and a seat cushion;
transforming said first side-facing sliding seat assembly from a first, seat configuration to a second, extended configuration;
transforming said second side-facing sliding seat assembly from a first, seat configuration to a second, extended configuration;
whereby said cushion of said first side-facing sliding seat assembly is placed into contact with and rests adjacent to said cushion of said second side-facing sliding seat assembly, thereby forming a flat, congruous surface;
activating a first motor connected to said base portion of said first side-facing sliding seat assembly, thereby moving said slide within said slide rail of said first side-facing sliding seat assembly; and
activating a second motor connected to said base portion of said second side-facing sliding seat assembly, thereby moving said slide within said slide rail of said second side-facing sliding seat assembly.

14. A method of deploying transformable furniture within a vehicle, the method comprising the steps:
installing a first side-facing sliding seat assembly within a vehicle, said first side-facing sliding seat assembly comprising a base portion, a slide rail connected to said base portion, a support portion, a slide connected to said support portion, and a seat cushion;
installing a second side-facing sliding seat assembly, said second side-facing sliding seat assembly comprising a base portion, a slide rail connected to said base portion, a support portion, a slide connected to said support portion, and a seat cushion;
transforming said first side-facing sliding seat assembly from a first, seat configuration to a second, extended configuration;
transforming said second side-facing sliding seat assembly from a first, seat configuration to a second, extended configuration;
whereby said cushion of said first side-facing sliding seat assembly is placed into contact with and rests adjacent to said cushion of said second side-facing sliding seat assembly, thereby forming a flat, congruous surface;
installing a sofa-bed assembly within said vehicle, said sofa-bed assembly comprising a back cushion, a sofa cushion, and a frame;
transforming said sofa-bed assembly from a first, sofa configuration to a second, bed configuration;
whereby said sofa cushion of said sofa-bed assembly rests adjacent to said cushion of said first side-facing sliding seat assembly and said cushion of said second side-facing sliding seat assembly, thereby forming a flat, congruous
activating a first motor connected to said base portion of said first side-facing sliding seat assembly, thereby moving said slide within said slide rail of said first side-facing sliding seat assembly;
activating a second motor connected to said base portion of said second side-facing sliding seat assembly, thereby moving said slide within said slide rail of said second side-facing sliding seat assembly; and
activating a third motor connected to said sofa-bed assembly frame, thereby moving said sofa-bed assembly from said first, sofa configuration to said second, bed configuration.

15. A method of deploying transformable furniture within a vehicle, the method comprising the steps:
installing a first side-facing sliding seat assembly within a vehicle, said first side-facing sliding seat assembly comprising a base portion, a slide rail connected to said base portion, a support portion, a slide connected to said support portion, and a seat cushion;
installing a second side-facing sliding seat assembly, said second side-facing sliding seat assembly comprising a base portion, a slide rail connected to said base portion, a support portion, a slide connected to said support portion, and a seat cushion;

transforming said first side-facing sliding seat assembly from a first, seat configuration to a second, extended configuration;
transforming said second side-facing sliding seat assembly from a first, seat configuration to a second, extended configuration;
whereby said cushion of said first side-facing sliding seat assembly is placed into contact with and rests adjacent to said cushion of said second side-facing sliding seat assembly, thereby forming a flat, congruous surface;
placing a first modular cushion into a gap between said first side-facing sliding seat assembly seat cushion and a first wall of said vehicle;
placing a second modular cushion into a gap between said second side-facing sliding seat assembly seat cushion and a second wall of said vehicle; and
whereby said first modular cushion, said second modular cushion, said seat cushion of said first side-facing sliding seat assembly, and said seat cushion of said second side-facing sliding seat assembly combine to form a congruous, flat surface.

\* \* \* \* \*